US012631028B2

(12) United States Patent
Haddock

(10) Patent No.: US 12,631,028 B2
(45) Date of Patent: May 19, 2026

(54) METAL PANEL ELECTRICAL BONDING CLIP

(71) Applicant: RMH Tech LLC, Colorado Springs, CO (US)

(72) Inventor: Dustin M. M. Haddock, Colorado Springs, CO (US)

(73) Assignee: RMH TECH LLC, Colorado Springs, CO (US)

( * ) Notice: Subject to any disclaimer, the term of this patent is extended or adjusted under 35 U.S.C. 154(b) by 0 days.

(21) Appl. No.: 18/503,001

(22) Filed: Nov. 6, 2023

(65) Prior Publication Data

US 2024/0068237 A1 Feb. 29, 2024

Related U.S. Application Data

(60) Division of application No. 17/398,146, filed on Aug. 10, 2021, now Pat. No. 11,808,043, which is a (Continued)

(51) Int. Cl.
*E04D 3/362* (2006.01)
*E04D 3/363* (2006.01)
(Continued)

(52) U.S. Cl.
CPC ............. *E04D 3/362* (2013.01); *E04D 3/363* (2013.01); *E04D 13/00* (2013.01); *H01R 4/58* (2013.01);
(Continued)

(58) Field of Classification Search
CPC ......... E04D 3/362; E04D 3/363; E04D 3/366; E04D 13/00; E04D 3/30; H01R 4/48; H01R 4/58; H01R 4/64; H01R 4/26
(Continued)

(56) References Cited

U.S. PATENT DOCUMENTS 42,992 A 5/1864 Howe
97,316 A 11/1869 Rogers
(Continued)

FOREIGN PATENT DOCUMENTS

AT 13076 8/1903
AT 26329 11/1906
(Continued)

OTHER PUBLICATIONS

"Ace Clamp Cut Sheet | 5031 Z1-2," Ace Clamp, Nov. 2018, 1 page.
(Continued)

*Primary Examiner* — Brian D Mattei
*Assistant Examiner* — Joseph J. Sadlon
(74) *Attorney, Agent, or Firm* — Sheridan Ross P.C.

(57) ABSTRACT

A clip for electrically bonding a pair of adjacently-disposed metal panels is disclosed. One embodiment entails such a clip (104) including a first clip member (112) and an oppositely disposed second clip member (116). The surface (114) of the first clip member (112) that faces the second clip member (116) includes at least one grounding projection (128), while the surface (118) of the second clip member (116) that faces the first clip member (112) also includes at least one grounding projection (128). The clip (104) may be installed on a standing seam (102) of a panel assembly (100), with its first clip member (112) engaging one of the metal panels 82" that define this stand seam (102) and with its second clip member (116) engaging the other of the metal panels 82" that define this same standing seam (102).

20 Claims, 14 Drawing Sheets

Related U.S. Application Data continuation of application No. 16/866,080, filed on May 4, 2020, now Pat. No. 11,085,188, which is a continuation of application No. 15/798,023, filed on Oct. 30, 2017, now Pat. No. 10,640,980.

(60) Provisional application No. 62/415,355, filed on Oct. 31, 2016.

(51) Int. Cl.

*E04D 13/00* (2006.01)
*H01R 4/58* (2006.01)
*E04D 3/366* (2006.01)
*H01R 4/48* (2006.01)
*H01R 4/64* (2006.01)

(52) U.S. Cl.

CPC ................ *E04D 3/366* (2013.01); *H01R 4/48* (2013.01); *H01R 4/64* (2013.01)

(58) Field of Classification Search

USPC .................................................. 52/98, 716.7
See application file for complete search history.

(56) References Cited

U.S. PATENT DOCUMENTS

| | | | | | |
|---|---|---|---|---|---|
| 106,580 | A | | 8/1870 | Hathorn | |
| 182,193 | A | * | 9/1876 | Holeton | E04B 9/068 52/465 |
| 189,431 | A | | 4/1877 | Creighton | |
| 224,608 | A | | 2/1880 | Rendle | |
| 250,580 | A | | 12/1881 | Rogers | |
| 332,413 | A | | 12/1885 | List | |
| 386,316 | A | | 7/1888 | Hawthorne | |
| 405,605 | A | | 6/1889 | Sagendorph | |
| 407,772 | A | | 7/1889 | Curtis et al. | |
| 446,217 | A | | 2/1891 | Dickelman | |
| 459,876 | A | | 9/1891 | Powers | |
| 472,014 | A | | 3/1892 | Densmore | |
| 473,512 | A | | 4/1892 | Laird | |
| 491,173 | A | | 2/1893 | Hayward | |
| 507,776 | A | | 10/1893 | Berger et al. | |
| 529,774 | A | | 11/1894 | Baird | |
| 602,983 | A | | 4/1898 | Folsom | |
| 733,697 | A | | 7/1903 | Chronik | |
| 756,884 | A | | 4/1904 | Parry | |
| 831,445 | A | | 9/1906 | Kosmatka | |
| 881,757 | A | | 3/1908 | Winsor | |
| 884,850 | A | | 4/1908 | Peter | |
| 927,522 | A | | 7/1909 | Gery | |
| 933,784 | A | | 9/1909 | Peter | |
| 939,516 | A | | 11/1909 | Laird | |
| 942,693 | A | * | 12/1909 | Wintermute | F16B 12/24 16/DIG. 24 |
| 1,054,091 | A | | 2/1913 | Darnall | |
| 1,085,474 | A | | 1/1914 | Peterson | |
| 1,136,460 | A | | 4/1915 | Wright | |
| 1,230,363 | A | | 6/1917 | Baird | |
| 1,279,669 | A | | 9/1918 | Deming | |
| 1,330,309 | A | | 2/1920 | Dixon | |
| 1,399,461 | A | | 12/1921 | Childs | |
| 1,463,065 | A | | 7/1923 | Sieger | |
| 1,465,042 | A | | 8/1923 | Hruska | |
| 1,477,088 | A | | 12/1923 | Turner | |
| 1,511,529 | A | | 10/1924 | Standlee | |
| 1,620,428 | A | | 3/1927 | Becker | |
| 1,673,135 | A | * | 6/1928 | Beardsley | H01R 4/48 439/861 |
| 1,681,830 | A | * | 8/1928 | White | E04D 3/366 52/470 |
| 1,723,166 | A | * | 8/1929 | Hayman | E04D 3/363 52/522 |
| 1,735,927 | A | | 11/1929 | Shaffer | |
| 1,735,937 | A | | 11/1929 | Shaffer | |
| 1,780,852 | A | * | 11/1930 | Sullivan | E06B 3/5481 126/200 |
| 1,794,976 | A | | 3/1931 | Mueller | |
| 1,812,009 | A | | 6/1931 | Lenke | |
| 1,893,481 | A | | 1/1933 | Adams | |
| 1,946,862 | A | | 2/1934 | Koch, Jr. | |
| 1,957,933 | A | | 5/1934 | Brandl | |
| 2,022,541 | A | | 11/1935 | Faistenhammer | |
| 2,079,768 | A | | 5/1937 | Levow | |
| 2,150,497 | A | | 3/1939 | Fernberg | |
| 2,183,008 | A | | 12/1939 | Camp | |
| 2,183,844 | A | | 12/1939 | Murphy | |
| 2,192,720 | A | | 3/1940 | Tapman | |
| 2,201,320 | A | | 5/1940 | Place | |
| 2,243,322 | A | * | 5/1941 | Van Uum | F16B 5/125 52/716.7 |
| 2,250,401 | A | | 7/1941 | Sylvester | |
| 2,274,010 | A | | 2/1942 | Stellin | |
| 2,340,692 | A | | 2/1944 | Ridd | |
| 2,356,833 | A | * | 8/1944 | Doe | E04D 3/366 52/466 |
| 2,429,833 | A | | 10/1947 | Luce | |
| 2,443,362 | A | | 6/1948 | Tinnerman | |
| 2,448,752 | A | | 9/1948 | Wagner | |
| 2,457,250 | A | | 12/1948 | Macomber | |
| 2,472,586 | A | | 6/1949 | Harvey | |
| 2,504,776 | A | | 4/1950 | Woodfield et al. | |
| 2,525,217 | A | | 10/1950 | Glitsch | |
| 2,574,007 | A | | 11/1951 | Anderson | |
| 2,658,247 | A | | 11/1953 | Heuer | |
| 2,685,720 | A | * | 8/1954 | Petri | F16B 21/20 439/877 |
| 2,714,037 | A | | 7/1955 | Singer et al. | |
| 2,730,381 | A | | 1/1956 | Curtiss | |
| RE24,133 | E | | 3/1956 | Bloedow | |
| 2,740,027 | A | | 3/1956 | Budd et al. | |
| 2,808,491 | A | | 10/1957 | Rhee et al. | |
| 2,810,173 | A | | 10/1957 | Bearden | |
| 2,875,805 | A | | 3/1959 | Flora | |
| 2,968,780 | A | * | 1/1961 | Roswell | H01R 12/58 439/81 |
| 2,985,174 | A | | 5/1961 | Guth | |
| 2,997,685 | A | * | 8/1961 | Anderson | H01R 4/4821 439/786 |
| 2,997,763 | A | | 8/1961 | Serfass | |
| 3,039,161 | A | | 6/1962 | Gagnon | |
| 3,064,772 | A | | 11/1962 | Clay | |
| 3,095,672 | A | | 7/1963 | Di Tullio | |
| 3,112,016 | A | | 11/1963 | Peterson | |
| 3,136,206 | A | | 6/1964 | Adams | |
| 3,194,524 | A | | 7/1965 | Trumbull | |
| 3,208,119 | A | * | 9/1965 | Seckerson | F16B 5/121 52/712 |
| 3,221,467 | A | | 12/1965 | Henkels | |
| 3,231,076 | A | | 1/1966 | Frieman | |
| 3,232,393 | A | | 2/1966 | Attwood | |
| 3,232,573 | A | | 2/1966 | Berman | |
| 3,242,620 | A | | 3/1966 | Kaiser | |
| 3,247,316 | A | | 4/1966 | Weimer, Jr. | |
| 3,269,075 | A | | 8/1966 | Marini et al. | |
| 3,288,409 | A | | 11/1966 | Bethea, Jr. | |
| 3,296,750 | A | | 1/1967 | Zaleski | |
| 3,298,653 | A | | 1/1967 | Omholt | |
| 3,300,935 | A | | 1/1967 | Giorgio | |
| 3,301,513 | A | | 1/1967 | Masao | |
| 3,307,235 | A | | 3/1967 | Hennings | |
| 3,318,057 | A | | 5/1967 | Norsworthy | |
| 3,333,799 | A | | 8/1967 | Peterson | |
| 3,335,995 | A | | 8/1967 | Pickles | |
| 3,341,909 | A | | 9/1967 | Havener | |
| 3,363,864 | A | | 1/1968 | Olgreen | |
| 3,369,210 | A | * | 2/1968 | Menickella | H01R 4/48 D13/133 |
| 3,394,524 | A | | 7/1968 | Howarth | |
| 3,398,018 | A | * | 8/1968 | Walters | B05D 5/06 427/163.4 |
| 3,411,190 | A | * | 11/1968 | Augier | F16B 5/121 24/297 |

(56) References Cited

U.S. PATENT DOCUMENTS 3,411,252 A 11/1968 Boyle, Jr.
3,425,127 A 2/1969 Long
3,482,369 A 12/1969 Burke
3,486,158 A * 12/1969 Soltysik ............... H01R 12/714 439/444
3,495,363 A 2/1970 Johnson
3,496,691 A 2/1970 Seaburg et al.
3,503,244 A 3/1970 Joslin
3,523,709 A 8/1970 Heggy et al.
3,527,619 A 9/1970 Miley
3,528,050 A * 9/1970 Hindenburg ......... H01R 13/648 439/535
3,565,380 A 2/1971 Langren
3,572,623 A 3/1971 Lapp
3,590,543 A 7/1971 Heirich
3,656,747 A 4/1972 Revell, Jr. et al.
3,667,182 A 6/1972 Stemler
3,667,185 A 6/1972 Maurer
3,715,705 A 2/1973 Kuo
3,719,919 A 3/1973 Tibolla
3,753,326 A 8/1973 Kaufman, Sr.
D229,392 S 11/1973 Faust
3,778,537 A 12/1973 Miller
3,778,749 A * 12/1973 Kapell ................... H01R 4/646 439/99
D229,743 S 1/1974 Moore
3,792,560 A 2/1974 Naylor
3,809,799 A 5/1974 Taylor
3,810,069 A 5/1974 Jaconette, Jr.
3,817,270 A 6/1974 Ehrens et al.
3,824,664 A 7/1974 Seeff
3,845,601 A 11/1974 Kostecky
3,861,098 A 1/1975 Schaub
3,864,789 A * 2/1975 Leitner ................. F16B 5/0657 52/716.7
3,904,161 A 9/1975 Scott
3,914,001 A 10/1975 Nelson et al.
3,921,253 A 11/1975 Nelson
3,934,385 A * 1/1976 Paulus ..................... B60J 10/18 52/716.5
3,960,352 A 6/1976 Plattner et al.
3,964,149 A 6/1976 Hugh
3,965,540 A 6/1976 Moore
3,984,951 A * 10/1976 Hindman ............ E04D 13/1637 52/96
3,986,746 A 10/1976 Chartier
3,998,018 A 12/1976 Hodges
4,001,474 A 1/1977 Hereth
4,007,574 A 2/1977 Riddell
4,018,538 A 4/1977 Smyrni et al.
4,034,532 A 7/1977 Reinwall, Jr.
4,043,579 A * 8/1977 Meyer ..................... F16B 5/125 D12/172
4,051,289 A 9/1977 Adamson
4,084,289 A 4/1978 Naimo
4,085,997 A * 4/1978 Hainsworth ........... C25D 17/06 269/286
4,100,709 A 7/1978 Good
4,127,975 A 12/1978 Judkins
4,130,970 A 12/1978 Cable
4,132,390 A * 1/1979 Pfarr, Jr. ............... E04H 17/163 256/73
4,141,182 A 2/1979 McMullen
4,147,257 A 4/1979 Zippel
4,162,595 A 7/1979 Ramos et al.
4,162,755 A 7/1979 Bott
4,162,817 A * 7/1979 Briggs ................. H01R 12/714 439/329
4,189,882 A 2/1980 Harrison et al.
4,189,891 A 2/1980 Johnson et al.
4,200,107 A 4/1980 Reid
4,203,646 A 5/1980 Desso et al.
4,203,648 A 5/1980 Seidler
4,213,282 A 7/1980 Heckelsberg
4,215,677 A 8/1980 Erickson
4,219,252 A * 8/1980 Fischer .................... H05B 3/04 439/839
4,223,053 A 9/1980 Brogan
4,223,667 A 9/1980 Paymal
4,241,970 A * 12/1980 Rider, Jr. ............. H01R 13/112 439/856
4,252,458 A 2/1981 Keen
4,261,338 A 4/1981 McAlister
4,261,384 A 4/1981 Dahlbring
4,263,474 A 4/1981 Tennant
4,270,721 A 6/1981 Mainor, Jr.
4,280,484 A 7/1981 Mancosu
4,291,934 A 9/1981 Kund
4,296,530 A * 10/1981 Muller .................... F16B 5/125 52/204.591
4,307,976 A 12/1981 Butler
4,321,416 A 3/1982 Tennant
4,350,400 A * 9/1982 Gaynor .............. H01R 33/0809 439/229
4,351,140 A 9/1982 Simpson
4,358,916 A 11/1982 Lacasse
4,366,656 A 1/1983 Simpson
4,393,859 A 7/1983 Marossy et al.
4,406,505 A * 9/1983 Avramovich ............ H01R 4/64 439/97
4,449,335 A 5/1984 Fahey
4,456,321 A 6/1984 Jones et al.
4,461,514 A 7/1984 Schwarz
4,467,582 A 8/1984 Hague
4,475,776 A 10/1984 Teramachi
D277,934 S 3/1985 Beckrot
D280,973 S * 10/1985 Ferrell ........................... D8/395
4,546,586 A 10/1985 Knudson
4,560,224 A 12/1985 Weisenburger
4,567,706 A 2/1986 Wendt
4,570,405 A 2/1986 Knudson
4,571,013 A * 2/1986 Suffi ......................... H01R 4/64 439/99
4,588,240 A 5/1986 Ruehl et al.
4,593,877 A 6/1986 van der Wyk
4,601,600 A 7/1986 Karlsson
4,649,684 A 3/1987 Petree et al.
4,654,743 A * 3/1987 Ruehl .................... H04Q 1/146 439/620.08
4,656,794 A 4/1987 Thevenin et al.
4,666,116 A 5/1987 Lloyd
4,669,808 A 6/1987 Owen
4,674,252 A 6/1987 Nicholas et al.
4,682,454 A 7/1987 Simpson
4,686,809 A 8/1987 Skelton
4,701,586 A 10/1987 Hagberg
4,704,058 A 11/1987 Crunwell
4,753,425 A 6/1988 Yang
4,773,791 A 9/1988 Hartkorn
4,782,642 A 11/1988 Conville
4,799,444 A 1/1989 Lisowski
4,805,364 A 2/1989 Smolik
4,809,476 A 3/1989 Satchell
4,810,573 A 3/1989 Harriett
4,835,927 A 6/1989 Michlovic
4,840,529 A 6/1989 Phillips
4,846,431 A 7/1989 Pflieger
4,848,858 A 7/1989 Suzuki
4,854,096 A 8/1989 Smolik
4,864,081 A 9/1989 Bates
D304,421 S 11/1989 Holdaway
4,878,331 A 11/1989 Taylor
4,883,397 A * 11/1989 Dubost ................ F16B 5/0635 411/522
4,895,338 A 1/1990 Froutzis
4,901,963 A 2/1990 Yoder
4,901,964 A 2/1990 McConnell
4,905,444 A 3/1990 Semaan
4,909,011 A 3/1990 Freeman et al.
4,949,929 A 8/1990 Kesselman et al.
4,961,712 A 10/1990 Schwenk et al.
D312,315 S 11/1990 Westphal

(56) References Cited

U.S. PATENT DOCUMENTS 4,970,833 A 11/1990 Porter
4,987,699 A 1/1991 Gold
4,991,368 A 2/1991 Amstutz
4,993,959 A 2/1991 Randolph
5,007,612 A 4/1991 Manfre
5,019,111 A 5/1991 Dempsey et al.
5,036,949 A 8/1991 Crocker et al.
5,039,352 A 8/1991 Mueller
5,092,939 A 3/1992 Nath et al.
5,094,435 A 3/1992 Depperman
D326,403 S 5/1992 Kleiss
5,118,571 A 6/1992 Petersen
5,119,612 A 6/1992 Taylor et al.
5,125,608 A 6/1992 McMaster et al.
5,127,205 A 7/1992 Eidson
5,138,820 A 8/1992 Pearce
5,140,793 A 8/1992 Knudson
5,152,107 A 10/1992 Strickert
5,154,385 A 10/1992 Lindberg et al.
5,164,020 A 11/1992 Wagner et al.
5,176,462 A 1/1993 Chen
5,187,911 A 2/1993 Cotter
5,209,619 A 5/1993 Rinderer
5,213,300 A 5/1993 Rees
5,222,340 A 6/1993 Bellem
5,224,427 A 7/1993 Riches et al.
5,228,248 A 7/1993 Haddock
5,251,993 A 10/1993 Sigourney
5,259,166 A * 11/1993 Carey, II .................. E03B 3/02 52/749.12
5,268,038 A 12/1993 Riermeier et al.
5,271,194 A 12/1993 Drew
5,277,006 A 1/1994 Ruster
5,282,340 A 2/1994 Cline et al.
5,287,670 A 2/1994 Funaki
5,290,366 A 3/1994 Riermeier et al.
5,307,601 A 5/1994 McCracken
5,312,079 A 5/1994 Little, Jr.
5,313,752 A 5/1994 Hatzinikolas
D347,701 S 6/1994 McCracken
5,352,154 A 10/1994 Rotter et al.
5,355,646 A * 10/1994 Bischel .................... E04B 9/16 52/489.1
5,356,519 A 10/1994 Grabscheid et al.
5,356,705 A 10/1994 Kelch et al.
D351,989 S 11/1994 Cline et al.
5,363,615 A 11/1994 Christopher et al.
5,363,624 A 11/1994 Cotter
5,379,567 A 1/1995 Vahey
5,390,453 A 2/1995 Untiedt
5,391,084 A 2/1995 Kreitzman
5,392,574 A 2/1995 Sayers
5,408,797 A 4/1995 Bellem
5,409,549 A 4/1995 Mori
5,413,063 A 5/1995 King
5,413,397 A 5/1995 Gold
5,417,028 A 5/1995 Meyer
5,425,209 A 6/1995 Funaki
5,426,906 A 6/1995 McCracken
5,439,307 A 8/1995 Steinhilber
5,451,167 A * 9/1995 Zielinski ................ H01R 4/245 439/435
5,453,027 A 9/1995 Buell et al.
D364,338 S 11/1995 Cline
5,479,752 A 1/1996 Menegoli
5,482,234 A 1/1996 Lyon
5,483,772 A 1/1996 Haddock
5,483,782 A 1/1996 Hall
5,491,931 A 2/1996 Haddock
5,497,591 A 3/1996 Nelson
5,511,348 A 4/1996 Cornell
5,517,731 A * 5/1996 Spykerman ........... F16B 5/0028 52/582.1
5,522,185 A 6/1996 Cline
5,533,839 A 7/1996 Shimada
D372,421 S 8/1996 Cline
5,557,903 A 9/1996 Haddock
D375,449 S 11/1996 Dahlberg
5,571,338 A 11/1996 Kadonome et al.
5,596,858 A 1/1997 Jordan
5,596,859 A 1/1997 Horton et al.
5,598,785 A 2/1997 Zaguroli, Jr.
5,599,192 A * 2/1997 Olson .................. H01R 12/716 439/660
5,600,971 A 2/1997 Suk
D378,343 S 3/1997 Macor
5,609,326 A 3/1997 Stearns et al.
5,613,328 A 3/1997 Alley
5,634,618 A * 6/1997 Farmer, Jr. ................ E06B 9/00 248/229.26
5,640,812 A 6/1997 Crowley et al.
5,647,178 A 7/1997 Cline
5,651,837 A 7/1997 Ohtsuka et al.
5,660,008 A 8/1997 Bevilacqua
5,664,750 A 9/1997 Cohen
5,667,181 A 9/1997 van Leeuwen et al.
D384,574 S 10/1997 Cox
5,681,191 A 10/1997 Robicheau et al.
5,688,131 A 11/1997 Byfield, Jr.
D387,064 S 12/1997 Heine
D387,443 S 12/1997 Blankenbiller
5,694,721 A 12/1997 Haddock
5,697,197 A 12/1997 Simpson
5,715,633 A 2/1998 Raz
5,715,640 A 2/1998 Haddock
5,732,513 A 3/1998 Alley
5,743,063 A 4/1998 Boozer
5,743,497 A 4/1998 Michael
5,746,029 A 5/1998 Ullman
5,755,824 A 5/1998 Blechschmidt et al.
5,765,310 A 6/1998 Gold
5,765,329 A 6/1998 Huang
5,787,653 A 8/1998 Sakai et al.
5,794,386 A 8/1998 Klein
5,809,703 A 9/1998 Kelly
5,826,379 A 10/1998 Curry
5,826,390 A 10/1998 Sacks
5,828,008 A 10/1998 Lockwood et al.
5,829,723 A 11/1998 Brunner et al.
5,842,318 A 12/1998 Bass et al.
5,853,296 A 12/1998 Gunther et al.
5,857,301 A * 1/1999 Fujita ........................ E04B 9/18 52/489.1
5,885,118 A 3/1999 Billenstein et al.
5,890,340 A 4/1999 Kafarowski
5,897,088 A 4/1999 Kirschner
5,901,507 A 5/1999 Smeja et al.
5,911,663 A * 6/1999 Eidson .................. E04D 13/165 52/537
5,942,046 A 8/1999 Kahlfuss et al.
5,952,608 A * 9/1999 Kim ..................... H05K 9/0016 174/355
5,970,586 A 10/1999 Demel et al.
5,983,588 A 11/1999 Haddock
5,987,714 A 11/1999 Smith
5,994,640 A 11/1999 Bansemir et al.
5,997,368 A 12/1999 Mello et al.
6,029,415 A 2/2000 Culpepper et al.
D424,410 S 5/2000 Lodi
6,073,410 A 6/2000 Schimpf et al.
6,073,920 A 6/2000 Colley
6,079,678 A 6/2000 Schott et al.
6,083,010 A 7/2000 Daoud
6,088,979 A 7/2000 Neal
6,095,462 A 8/2000 Morgan
6,099,203 A 8/2000 Landes
6,105,317 A 8/2000 Tomiuchi et al.
6,106,310 A 8/2000 Davis et al.
6,111,189 A 8/2000 Garvison et al.
6,119,317 A 9/2000 Pfister
6,132,070 A 10/2000 Vosika et al.
6,152,667 A * 11/2000 LeVey ................... F16B 21/183 411/521
6,158,180 A 12/2000 Edwards

(56) References Cited

U.S. PATENT DOCUMENTS 6,164,033 A 12/2000 Haddock
6,182,403 B1 2/2001 Mimura et al.
6,186,799 B1 2/2001 Mello
6,206,991 B1 3/2001 Starr
6,223,477 B1 5/2001 Alley
6,237,297 B1 5/2001 Paroly
6,253,496 B1 7/2001 Gilchrist
6,256,934 B1 7/2001 Alley
6,269,596 B1 8/2001 Ohtsuka et al.
6,276,285 B1 8/2001 Ruch
6,312,283 B1 11/2001 Hio
6,320,114 B1 11/2001 Kuechler
6,336,616 B1 1/2002 Lin
6,354,045 B1 3/2002 Boone et al.
6,360,491 B1 3/2002 Ullman
6,364,262 B1 4/2002 Gibson et al.
6,364,374 B1 4/2002 Noone et al.
6,370,828 B1 4/2002 Genschorek
6,382,569 B1 5/2002 Schattner et al.
6,385,914 B2 5/2002 Alley
6,393,796 B1 5/2002 Goettl et al.
6,443,680 B1 9/2002 Bodin
6,449,814 B1 9/2002 Dinsmore
6,453,623 B1 9/2002 Nelson et al.
6,470,629 B1 10/2002 Haddock
6,475,577 B1 * 11/2002 Hopton ................ B62D 29/002 296/205
6,490,838 B2 * 12/2002 Summerford ............. E04B 5/06 52/480
6,497,080 B1 12/2002 Malcolm
6,499,259 B1 12/2002 Hockman
6,508,442 B1 1/2003 Dolez
6,521,821 B2 2/2003 Makita et al.
6,534,702 B1 3/2003 Makita et al.
6,536,166 B1 3/2003 Alley
6,536,729 B1 3/2003 Haddock
6,576,830 B2 6/2003 Nagao et al.
6,588,722 B2 7/2003 Eguchi
6,602,016 B2 8/2003 Eckart et al.
6,622,441 B2 9/2003 Miller
6,637,671 B2 10/2003 Alley
6,647,671 B1 11/2003 Alley
6,655,633 B1 12/2003 Chapman, Jr.
6,665,991 B2 12/2003 Hasan
6,688,047 B1 2/2004 McNichol
D487,595 S 3/2004 Sherman
6,715,256 B1 4/2004 Fischer
6,718,718 B2 4/2004 Haddock
6,725,623 B1 4/2004 Riddell et al.
6,730,841 B2 5/2004 Heckeroth
6,732,982 B1 5/2004 Messinger
6,751,919 B2 6/2004 Calixto
D495,595 S 9/2004 Dressler
D496,738 S 9/2004 Sherman
6,799,742 B2 10/2004 Nakamura et al.
6,834,466 B2 12/2004 Trevorrow et al.
6,848,230 B2 2/2005 Kopish
6,851,241 B2 * 2/2005 Pervan .................... E04F 15/04 52/592.1
6,851,965 B1 * 2/2005 Czabanski ............. H01R 12/67 439/492
6,918,217 B2 7/2005 Jakob-Bamberg et al.
6,918,727 B2 7/2005 Huang
6,922,948 B2 8/2005 Smeja et al.
6,967,278 B2 11/2005 Hatsukaiwa et al.
D513,171 S 12/2005 Richardson
7,012,188 B2 3/2006 Erling
7,013,612 B2 3/2006 Haddock
7,063,763 B2 6/2006 Chapman, Jr.
7,096,638 B2 * 8/2006 Osterland ............... B60R 13/04 24/295
7,100,338 B2 9/2006 Haddock
7,104,020 B1 9/2006 Suttle
7,127,852 B1 10/2006 Dressler
7,128,583 B2 * 10/2006 Tsuo .................... H01R 13/648 439/92
D532,291 S 11/2006 Geers
7,191,794 B2 3/2007 Hodges
7,195,513 B1 3/2007 Gherardini
7,219,863 B1 5/2007 Collett, II
D547,262 S 7/2007 Ullman
7,240,770 B2 7/2007 Mullins et al.
7,243,400 B2 * 7/2007 Boville ................. F16B 37/043 411/175
7,260,918 B2 8/2007 Liebendorfer
7,260,919 B1 8/2007 Spransy
7,281,695 B2 10/2007 Jordan
7,340,863 B1 * 3/2008 Dressler ................ E04D 13/076 52/12
7,386,922 B1 6/2008 Taylor et al.
7,406,924 B1 8/2008 Impey
7,410,139 B1 8/2008 Rorich
D576,107 S 9/2008 Sayres
7,431,252 B2 10/2008 Birli et al.
7,435,134 B2 10/2008 Lenox
7,451,573 B2 11/2008 Orszulak et al.
7,458,555 B2 12/2008 Mastropaolo et al.
7,459,196 B2 12/2008 Sturm
7,469,511 B2 12/2008 Wobber
7,493,730 B2 2/2009 Fennell, Jr.
D589,337 S 3/2009 Karlsson
7,513,080 B1 4/2009 Showalter
7,516,580 B2 4/2009 Fennell, Jr.
7,568,871 B2 8/2009 Chopp, Jr. et al.
7,574,839 B1 8/2009 Simpson
7,578,711 B2 8/2009 Robinson
D600,543 S 9/2009 Coles
7,600,349 B2 10/2009 Liebendorfer
7,621,090 B2 * 11/2009 Kelley ...................... E04B 9/28 52/715
7,634,875 B2 12/2009 Genschorek
7,658,356 B1 2/2010 Nehls
7,686,625 B1 * 3/2010 Dyer ...................... H01R 11/22 439/907
7,703,256 B2 4/2010 Haddock
7,707,800 B2 5/2010 Kannisto
7,712,278 B2 5/2010 Lonardi
7,717,387 B2 * 5/2010 Naheem ................ E01B 26/005 238/351
7,721,492 B2 5/2010 Plaisted et al.
7,731,138 B2 6/2010 Wiesner et al.
7,733,667 B2 6/2010 Qin et al.
7,739,839 B1 * 6/2010 Crabtree ................. E04D 13/08 52/716.2
7,758,003 B2 7/2010 Pourtier et al.
7,758,011 B2 7/2010 Haddock
7,762,027 B1 7/2010 Wentworth et al.
7,766,292 B2 8/2010 Liebendorfer
7,780,472 B2 8/2010 Lenox
7,788,874 B2 9/2010 Miller
7,788,879 B2 9/2010 Brandes et al.
7,824,191 B1 11/2010 Browder
7,827,920 B2 11/2010 Beck et al.
7,845,127 B2 12/2010 Brescia
7,847,181 B2 12/2010 Brescia
7,861,480 B2 1/2011 Wendelburg et al.
7,861,485 B1 1/2011 Wentworth et al.
7,874,117 B1 1/2011 Simpson
7,877,937 B2 * 2/2011 Dutra .................... H10F 77/484 52/173.3
7,891,618 B2 2/2011 Carnevali
7,895,808 B1 3/2011 Wentworth et al.
7,905,064 B1 3/2011 Wentworth et al.
7,915,519 B2 3/2011 Kobayashi
7,926,777 B2 4/2011 Koesema, Jr.
7,954,287 B2 6/2011 Bravo et al.
7,976,257 B2 7/2011 Kufner et al.
7,988,464 B2 8/2011 Kossak et al.
8,011,153 B2 9/2011 Orchard
8,056,195 B2 * 11/2011 Zwier ...................... A01G 9/28 24/545
8,066,200 B2 11/2011 Hepner et al.

(56) References Cited

U.S. PATENT DOCUMENTS 8,070,119 B2 12/2011 Taylor
8,092,129 B2 1/2012 Wiley et al.
8,096,503 B2 1/2012 Verweyen
8,099,837 B2 1/2012 Santlin et al.
D653,611 S 2/2012 Lee
D653,940 S 2/2012 Yasher
8,109,048 B2 2/2012 West
8,146,299 B2 4/2012 Stearns et al.
8,151,522 B2 4/2012 Stearns et al.
8,153,700 B2 4/2012 Stearns et al.
D658,977 S 5/2012 Riddell et al.
D659,522 S * 5/2012 Noturno ................ F16B 5/0028 D8/382
8,181,926 B2 5/2012 Magno, Jr. et al.
8,226,061 B2 7/2012 Nehls
8,251,326 B2 8/2012 McPheeters
8,272,172 B2 9/2012 Li
8,294,026 B2 10/2012 Wang et al.
D670,160 S 11/2012 Bitarchas
8,312,678 B1 11/2012 Haddock
8,316,590 B2 11/2012 Cusson
8,316,621 B2 11/2012 Safari Kermanshahi et al.
D674,513 S 1/2013 Liu
8,344,239 B2 1/2013 Plaisted
8,347,572 B2 1/2013 Piedmont
8,375,654 B1 2/2013 West et al.
8,387,319 B1 3/2013 Gilles-Gagnon et al.
8,404,963 B2 3/2013 Kobayashi
8,407,895 B2 4/2013 Hartelius et al.
8,413,946 B2 4/2013 Hartelius et al.
8,424,821 B2 4/2013 Liu
8,430,372 B2 4/2013 Haddock
D681,438 S 5/2013 Chen
D681,439 S 5/2013 Chen
8,448,405 B2 5/2013 Schaefer et al.
8,453,986 B2 6/2013 Schnitzer
8,458,967 B2 6/2013 Kalkanoglu et al.
8,495,997 B1 7/2013 Laubach
8,505,254 B2 8/2013 Welter et al.
8,528,888 B2 9/2013 Header
8,567,030 B2 10/2013 Koch
8,584,424 B2 11/2013 Smith
8,585,431 B2 * 11/2013 Dreier .................. H01R 4/4821 439/411
8,590,223 B2 11/2013 Kilgore et al.
8,596,009 B2 * 12/2013 Baxter .................... E04B 9/067 52/489.1
8,627,617 B2 1/2014 Haddock et al.
8,627,632 B2 1/2014 Werner et al.
D699,176 S 2/2014 Salomon et al.
8,640,402 B1 2/2014 Bilge
8,647,009 B2 2/2014 Kobayashi
8,656,649 B2 2/2014 Haddock
8,661,765 B2 3/2014 Schaefer
8,683,751 B2 4/2014 Stearns
8,695,290 B1 4/2014 Kim et al.
8,696,371 B2 * 4/2014 Byrne ...................... H01R 4/48 439/98
8,701,254 B2 * 4/2014 Lin ........................... B25B 5/06 24/336
8,701,354 B2 4/2014 Stearns et al.
8,701,372 B2 4/2014 Nuernberger et al.
8,713,881 B2 5/2014 DuPont et al.
8,726,587 B2 * 5/2014 Nuernberger ........... F24S 25/65 52/173.3
8,732,917 B2 5/2014 Zeilenga et al.
8,733,027 B1 5/2014 Marston et al.
8,745,935 B2 6/2014 DuPont et al.
8,752,338 B2 6/2014 Schaefer et al.
8,756,870 B2 6/2014 Teller et al.
8,769,911 B2 7/2014 Montgomery
8,770,885 B2 7/2014 Myers
8,776,456 B1 7/2014 Schrock
8,782,983 B2 7/2014 Stearns
8,791,611 B2 7/2014 Arnould et al.
8,806,813 B2 8/2014 Plaisted et al.
8,806,815 B1 8/2014 Liu et al.
8,813,441 B2 8/2014 Rizzo
8,826,163 B1 9/2014 Chanin et al.
8,826,618 B2 9/2014 Stearns
8,829,330 B2 9/2014 Meyer et al.
8,833,714 B2 9/2014 Haddock et al.
8,839,573 B2 9/2014 Cusson et al.
8,839,575 B1 9/2014 Liu et al.
8,844,234 B2 9/2014 Haddock et al.
8,850,754 B2 10/2014 Rizzo
8,854,829 B1 10/2014 Bopp et al.
8,875,463 B2 11/2014 Plagemann et al.
8,888,431 B2 11/2014 Haney
8,893,441 B1 11/2014 Hess, III et al.
8,894,424 B2 11/2014 DuPont
D718,703 S 12/2014 Rizzo
D718,704 S 12/2014 Rizzo
8,904,718 B2 12/2014 Schick et al.
8,910,928 B2 12/2014 Header
8,919,053 B2 12/2014 West
8,920,586 B2 12/2014 Poulakis
8,925,263 B2 1/2015 Haddock et al.
8,932,075 B2 * 1/2015 Reibke ................. H01R 4/4846 439/708
8,935,893 B2 1/2015 Liu et al.
8,938,932 B1 1/2015 Wentworth et al.
8,950,157 B1 2/2015 Schrock
8,955,259 B2 2/2015 Hemingway
8,966,833 B2 3/2015 Ally
8,991,065 B1 3/2015 Schrock
8,998,660 B2 * 4/2015 Bakos .................... H05K 3/325 439/878
9,003,728 B2 4/2015 Asci
9,003,733 B1 4/2015 Simpson et al.
9,010,042 B2 4/2015 Anderson et al.
9,011,034 B2 4/2015 Liu
9,052,123 B2 6/2015 Anderson et al.
9,065,191 B2 6/2015 Martin et al.
9,068,339 B2 6/2015 Schaefer et al.
9,070,990 B2 * 6/2015 Flickinger ................ H01R 4/10
9,076,899 B2 7/2015 Schrock
9,080,792 B2 7/2015 Patton
9,085,900 B2 7/2015 Haddock
9,086,185 B2 7/2015 Haddock
9,097,443 B2 8/2015 Liu et al.
9,127,451 B1 9/2015 Boor
9,134,044 B2 9/2015 Stearns et al.
9,147,785 B2 9/2015 Haddock et al.
9,147,986 B2 9/2015 Redel
D740,113 S 10/2015 Olenick
9,166,524 B2 10/2015 West et al.
9,175,878 B2 11/2015 Kemmer et al.
9,175,881 B2 11/2015 Schrock et al.
9,181,716 B1 * 11/2015 Gibson ..................... E04B 1/38
9,194,130 B1 11/2015 Stanley
9,194,613 B2 11/2015 Nuernberger et al.
9,200,456 B2 12/2015 Murphy
9,222,263 B2 12/2015 Haddock
9,223,907 B2 12/2015 Chanin et al.
9,243,817 B2 1/2016 West
9,273,708 B2 3/2016 Urban
9,273,885 B2 3/2016 Rodrigues et al.
9,291,369 B2 3/2016 West et al.
9,299,868 B2 3/2016 Thomas
9,306,490 B2 4/2016 Haddock et al.
9,309,910 B2 4/2016 Anderson et al.
9,318,818 B2 * 4/2016 Nakamura ............. H01R 43/16
9,318,831 B2 * 4/2016 Yamada ............. H01R 13/2442
9,324,986 B2 * 4/2016 Ahn .................... H01M 50/553
9,331,629 B2 5/2016 Cheung et al.
9,341,285 B2 5/2016 Magno, Jr. et al.
9,376,812 B2 * 6/2016 Porter ................... F16B 5/0225
9,416,803 B1 * 8/2016 McGarity ............... B42F 1/006
9,431,953 B2 8/2016 Stearns
9,447,988 B2 9/2016 Stearns et al.
9,473,064 B2 10/2016 Schaefer
9,473,066 B2 10/2016 Stephan et al.

(56) References Cited

U.S. PATENT DOCUMENTS 9,479,110 B2 10/2016 Patton et al.
9,496,697 B1 11/2016 Wentworth
9,518,596 B2 12/2016 West et al.
9,528,725 B2 12/2016 McPheeters
9,530,916 B2 12/2016 Haddock et al.
9,531,319 B2 12/2016 Braunstein et al.
9,534,390 B2 1/2017 Pendley et al.
9,587,427 B2 * 3/2017 Webb ........................ E06B 9/02
9,599,280 B2 3/2017 West et al.
9,608,559 B2 3/2017 Haddock et al.
9,611,652 B2 4/2017 Haddock et al.
9,647,433 B2 5/2017 Meine
9,647,607 B2 5/2017 Patton et al.
9,660,570 B2 5/2017 Stephan et al.
9,680,236 B2 * 6/2017 Ngo ......................... H01R 4/48
9,689,411 B2 6/2017 Meine et al.
9,712,106 B2 7/2017 Wentworth et al.
9,714,670 B2 7/2017 Header
9,722,532 B2 8/2017 Almy
9,732,512 B2 8/2017 Haddock
9,742,173 B2 8/2017 Wentworth
9,755,572 B2 9/2017 Wentworth et al.
D800,055 S 10/2017 Rothschild
9,813,012 B2 11/2017 Wentworth et al.
9,813,013 B2 11/2017 McPheeters et al.
9,819,303 B2 11/2017 Ash
9,831,817 B2 11/2017 Rothschild
9,845,584 B1 12/2017 Goldammer
9,845,599 B2 * 12/2017 Bogh ...................... E04D 3/364
9,850,661 B2 12/2017 Kovacs
9,853,593 B2 12/2017 Cinnamon et al.
9,853,594 B2 12/2017 Almy
9,863,665 B2 1/2018 West
9,865,938 B2 1/2018 Meine et al.
9,865,939 B2 * 1/2018 Luukkainen ......... H05K 9/0064
9,876,463 B2 1/2018 Jasmin
D810,008 S 2/2018 Mollison
9,893,676 B2 2/2018 Anderson et al.
9,893,677 B1 2/2018 Liu
9,920,516 B2 * 3/2018 Alter ................... E04D 13/1675
9,920,958 B2 3/2018 Haddock et al.
9,926,706 B2 3/2018 Hockman
9,935,382 B2 * 4/2018 Okura ................... F21V 23/002
9,966,745 B2 5/2018 Wentworth
9,985,361 B2 5/2018 Martin
9,985,575 B2 5/2018 Stearns et al.
9,988,816 B2 6/2018 Zhang et al.
10,021,986 B1 7/2018 Lin
10,036,414 B2 7/2018 Wiley et al.
10,036,576 B1 7/2018 Robinson
D827,160 S 8/2018 Menton
10,053,856 B2 8/2018 Haddock
10,054,336 B2 8/2018 Haddock et al.
D827,873 S 9/2018 Menton
D827,874 S 9/2018 Menton
10,077,562 B2 9/2018 Haddock et al.
10,088,201 B2 10/2018 Stephan
10,090,800 B2 10/2018 McPheeters
10,103,682 B2 10/2018 Haddock et al.
10,103,683 B2 10/2018 Wentworth
10,106,987 B2 10/2018 Haddock et al.
10,141,662 B2 11/2018 Bernard et al.
10,186,791 B2 1/2019 Meine et al.
D841,096 S 2/2019 Boyer
10,202,991 B2 2/2019 Lewis
10,202,995 B2 * 2/2019 Stickelberger ............ F16B 2/22
10,205,418 B2 2/2019 Nayar
10,208,874 B2 * 2/2019 Geiger .................... H02S 30/00
10,211,773 B2 2/2019 Jasmin et al.
10,211,775 B1 2/2019 Wentworth et al.
10,218,305 B1 2/2019 Schrock
10,240,820 B2 3/2019 Ash et al.
D846,978 S 4/2019 Dupont-Madinier
10,256,767 B1 4/2019 Sinai et al.
10,291,176 B2 5/2019 Wentworth et al.
10,298,169 B2 * 5/2019 Martin .................... F16B 2/005
10,302,333 B2 5/2019 McPheeters
10,312,855 B2 6/2019 Lester et al.
10,323,418 B2 6/2019 Karkheck
10,323,861 B2 6/2019 Peng
D853,954 S 7/2019 McPheeters
10,337,764 B2 7/2019 Ash et al.
10,359,069 B2 7/2019 Ash et al.
10,385,573 B2 8/2019 Van Leuven
10,396,704 B2 8/2019 Goodman
10,418,931 B2 9/2019 McPheeters
D863,604 S 10/2019 Sexton
10,432,133 B2 10/2019 Braunstein
10,443,896 B2 10/2019 Haddock et al.
10,454,190 B1 * 10/2019 Martin .................... H02S 30/00
RE47,733 E 11/2019 West
10,472,828 B2 11/2019 Stearns et al.
10,502,457 B2 12/2019 Haddock et al.
10,505,492 B2 12/2019 Hudson et al.
10,511,252 B2 12/2019 Wentworth et al.
10,530,293 B2 1/2020 Legall et al.
10,551,090 B2 2/2020 De Vogel et al.
10,584,447 B2 3/2020 Fenile
10,594,251 B2 3/2020 Stearns et al.
10,622,935 B1 4/2020 Liu
10,634,175 B2 4/2020 Haddock
10,640,980 B2 5/2020 Haddock
10,641,300 B2 5/2020 Header
10,644,643 B2 5/2020 Stearns et al.
D887,963 S 6/2020 Yang
10,673,151 B2 6/2020 Ash et al.
10,676,933 B2 6/2020 Van Leuven
10,686,401 B2 6/2020 Ash et al.
D890,085 S 7/2020 Baird
D890,601 S 7/2020 Gori
D890,602 S 7/2020 Gori
10,731,355 B2 8/2020 Haddock et al.
10,739,039 B2 8/2020 Werner
10,749,459 B1 8/2020 Liu et al.
10,749,466 B2 8/2020 Smeja
10,763,777 B2 9/2020 Stearns et al.
10,797,634 B1 10/2020 Jasmin et al.
10,816,240 B2 10/2020 Robinson
D902,163 S 11/2020 Ice
10,837,476 B2 11/2020 Lewis
D904,861 S 12/2020 McWilliams
10,851,826 B2 12/2020 Ash et al.
10,859,292 B2 12/2020 Haddock et al.
10,868,491 B2 12/2020 Wentworth et al.
10,903,785 B2 1/2021 Haddock et al.
D909,853 S 2/2021 Jasmin
10,931,225 B2 2/2021 Yang et al.
10,948,002 B2 3/2021 Haddock
11,009,262 B2 5/2021 Ash et al.
11,012,023 B2 5/2021 Stearns et al.
D923,203 S 6/2021 Muther
D923,823 S 6/2021 Muther
11,035,126 B2 6/2021 Haddock et al.
11,041,310 B1 6/2021 Haddock et al.
11,085,188 B2 8/2021 Haddock
11,118,353 B2 9/2021 Stearns et al.
11,121,484 B2 9/2021 Ash et al.
11,121,669 B2 9/2021 Stearns et al.
11,139,773 B2 10/2021 Eriksson
11,139,774 B2 10/2021 Wentworth et al.
11,189,941 B2 11/2021 Ash et al.
D939,332 S 12/2021 Kovacs
11,196,187 B2 12/2021 Ash et al.
11,201,581 B2 12/2021 Stearns et al.
11,296,648 B1 4/2022 Jasmin et al.
11,333,179 B2 5/2022 Haddock
11,352,793 B2 6/2022 Haddock et al.
11,368,005 B2 6/2022 Meine et al.
D962,047 S 8/2022 Muther
11,512,474 B2 11/2022 Haddock et al.
11,549,724 B2 1/2023 Zhu
11,552,591 B2 1/2023 Jasmin et al.
11,573,033 B2 2/2023 Haddock et al.
11,575,343 B2 2/2023 Wentworth et al.

(56) References Cited

U.S. PATENT DOCUMENTS

| | | | |
|---|---|---|---|
| D982,117 | S | 3/2023 | Liu |
| 11,616,468 | B2 | 3/2023 | Haddock et al. |
| D983,015 | S | 4/2023 | Jasmin et al. |
| D983,016 | S | 4/2023 | Jasmin et al. |
| D983,017 | S | 4/2023 | Jasmin et al. |
| D983,018 | S | 4/2023 | Jasmin et al. |
| D983,019 | S | 4/2023 | Jasmin et al. |
| 11,621,665 | B2 | 4/2023 | Jasmin et al. |
| D984,872 | S | 5/2023 | Jasmin et al. |
| 11,646,692 | B2 | 5/2023 | Wentworth et al. |
| 11,668,332 | B2 | 6/2023 | Haddock |
| 11,739,529 | B2 | 8/2023 | Haddock et al. |
| 11,742,793 | B2 | 8/2023 | Garza et al. |
| 11,750,143 | B1 | 9/2023 | Jasmin et al. |
| 11,757,400 | B1 | 9/2023 | Jasmin et al. |
| 11,770,097 | B1 | 9/2023 | Jasmin et al. |
| 11,774,143 | B2 | 10/2023 | Leitch et al. |
| 11,788,291 | B2 | 10/2023 | Haddock et al. |
| 11,808,043 | B2 | 11/2023 | Haddock |
| 11,815,292 | B2 | 11/2023 | Markiewicz |
| 11,848,638 | B1 | 12/2023 | Jasmin |
| 11,876,482 | B1 | 1/2024 | Jasmin et al. |
| 11,881,808 | B1 | 1/2024 | Jasmin et al. |
| 11,885,139 | B2 | 1/2024 | Haddock et al. |
| 11,949,373 | B1 | 4/2024 | Jasmin et al. |
| D1,025,763 | S | 5/2024 | Hu |
| D1,030,453 | S | 6/2024 | Fayfield |
| D1,030,634 | S | 6/2024 | Lin |
| 12,009,774 | B1 | 6/2024 | Jasmin |
| D1,035,419 | S | 7/2024 | Johnson |
| D1,037,839 | S | 8/2024 | Dunahay |
| 12,057,801 | B1 | 8/2024 | Jasmin et al. |
| D1,055,199 | S | 12/2024 | Zimmer |
| D1,057,910 | S | 1/2025 | Markopoulos |
| D1,058,511 | S | 1/2025 | Lin |
| D1,059,534 | S | 1/2025 | Roberson |
| D1,065,012 | S | 3/2025 | Yamanaka |
| D1,067,363 | S | 3/2025 | Roberson |
| 2002/0026765 | A1 | 3/2002 | Vahey |
| 2002/0088196 | A1 | 7/2002 | Haddock |
| 2002/0160635 | A1 | 10/2002 | Kurrer et al. |
| 2003/0015637 | A1 | 1/2003 | Liebendorfer |
| 2003/0062078 | A1 | 4/2003 | Mimura |
| 2003/0070368 | A1 | 4/2003 | Shingleton |
| 2003/0080267 | A1 | 5/2003 | Eslick |
| 2003/0131551 | A1 | 7/2003 | Mollinger et al. |
| 2003/0146346 | A1 | 8/2003 | Chapman, Jr. |
| 2003/0150632 | A1* | 8/2003 | Hsu ...................... H05K 9/0016 174/359 |
| 2003/0173460 | A1 | 9/2003 | Chapman, Jr. |
| 2003/0201009 | A1 | 10/2003 | Nakajima et al. |
| 2004/0035065 | A1 | 2/2004 | Orszulak et al. |
| 2004/0055233 | A1 | 3/2004 | Showalter |
| 2004/0164208 | A1 | 8/2004 | Nielson et al. |
| 2004/0231949 | A1 | 11/2004 | Le et al. |
| 2004/0237465 | A1 | 12/2004 | Refond |
| 2005/0095062 | A1 | 5/2005 | Iverson et al. |
| 2005/0102958 | A1 | 5/2005 | Anderson |
| 2005/0115176 | A1 | 6/2005 | Russell |
| 2005/0117997 | A1 | 6/2005 | Pinzl |
| 2005/0210769 | A1 | 9/2005 | Harvey |
| 2005/0257434 | A1 | 11/2005 | Hockman |
| 2006/0065805 | A1 | 3/2006 | Barton et al. |
| 2006/0075691 | A1 | 4/2006 | Verkamlp |
| 2006/0096061 | A1 | 5/2006 | Weiland et al. |
| 2006/0118163 | A1 | 6/2006 | Plaisted et al. |
| 2006/0174571 | A1 | 8/2006 | Panasik et al. |
| 2006/0174931 | A1 | 8/2006 | Mapes et al. |
| 2006/0230587 | A1 | 10/2006 | Okada |
| 2006/0254192 | A1 | 11/2006 | Fennell, Jr. |
| 2007/0075198 | A1 | 4/2007 | Foser |
| 2007/0131273 | A1 | 6/2007 | Kobayashi |
| 2007/0194191 | A1 | 8/2007 | Persson |
| 2007/0199590 | A1 | 8/2007 | Tanaka et al. |
| 2007/0241238 | A1 | 10/2007 | Neace |
| 2007/0246039 | A1 | 10/2007 | Brazier et al. |
| 2007/0248434 | A1 | 10/2007 | Wiley et al. |
| 2007/0289229 | A1 | 12/2007 | Aldo |
| 2007/0289233 | A1 | 12/2007 | Haddock |
| 2008/0035140 | A1 | 2/2008 | Placer et al. |
| 2008/0041011 | A1 | 2/2008 | Kannisto |
| 2008/0095591 | A1 | 4/2008 | Wu |
| 2008/0184639 | A1 | 8/2008 | Cotter |
| 2008/0190047 | A1 | 8/2008 | Allen |
| 2008/0236520 | A1 | 10/2008 | Maehara et al. |
| 2008/0265232 | A1 | 10/2008 | Terrels et al. |
| 2008/0292424 | A1 | 11/2008 | Kufner |
| 2008/0302407 | A1 | 12/2008 | Kobayashi |
| 2009/0000220 | A1 | 1/2009 | Lenox |
| 2009/0007520 | A1 | 1/2009 | Navon |
| 2009/0194098 | A1 | 8/2009 | Placer |
| 2009/0223741 | A1 | 9/2009 | Picard, Jr. |
| 2009/0229213 | A1 | 9/2009 | Mistelski |
| 2009/0230205 | A1 | 9/2009 | Hepner et al. |
| 2009/0320826 | A1 | 12/2009 | Kufner |
| 2010/0012805 | A1 | 1/2010 | Taylor |
| 2010/0058701 | A1 | 3/2010 | Yao et al. |
| 2010/0133040 | A1 | 6/2010 | London |
| 2010/0154784 | A1 | 6/2010 | King et al. |
| 2010/0162641 | A1 | 7/2010 | Reyal et al. |
| 2010/0171016 | A1 | 7/2010 | Haddock |
| 2010/0175738 | A1 | 7/2010 | Huss et al. |
| 2010/0192334 | A1* | 8/2010 | Reichle .................... B60M 5/02 24/457 |
| 2010/0192505 | A1 | 8/2010 | Schaefer et al. |
| 2010/0193651 | A1 | 8/2010 | Railsback et al. |
| 2010/0206303 | A1 | 8/2010 | Thorne |
| 2010/0212720 | A1 | 8/2010 | Meyer et al. |
| 2010/0276558 | A1 | 11/2010 | Faust et al. |
| 2010/0281784 | A1 | 11/2010 | Leo |
| 2010/0282290 | A1 | 11/2010 | Schwarze |
| 2010/0288337 | A1 | 11/2010 | Rizzo |
| 2010/0293874 | A1 | 11/2010 | Liebendorfer |
| 2010/0314517 | A1 | 12/2010 | Patzer |
| 2011/0000151 | A1 | 1/2011 | Hochreiter |
| 2011/0039458 | A1 | 2/2011 | Byrne |
| 2011/0078892 | A1 | 4/2011 | Hartelius et al. |
| 2011/0088340 | A1 | 4/2011 | Stobbe |
| 2011/0120047 | A1 | 5/2011 | Stearns et al. |
| 2011/0138585 | A1 | 6/2011 | Kmita et al. |
| 2011/0154750 | A1 | 6/2011 | Welter et al. |
| 2011/0162299 | A1 | 7/2011 | Azzolini |
| 2011/0174360 | A1 | 7/2011 | Plaisted et al. |
| 2011/0179606 | A1 | 7/2011 | Magno, Jr. et al. |
| 2011/0209745 | A1 | 9/2011 | Korman |
| 2011/0214365 | A1 | 9/2011 | Aftanas |
| 2011/0214388 | A1 | 9/2011 | London |
| 2011/0232212 | A1 | 9/2011 | Pierson et al. |
| 2011/0239546 | A1 | 10/2011 | Tsuzuki et al. |
| 2011/0247292 | A1 | 10/2011 | Li |
| 2011/0260027 | A1 | 10/2011 | Farnham, Jr. |
| 2011/0271611 | A1 | 11/2011 | Maracci et al. |
| 2011/0272545 | A1 | 11/2011 | Liu |
| 2011/0277296 | A1 | 11/2011 | Ramos |
| 2011/0314752 | A1 | 12/2011 | Meier |
| 2012/0001046 | A1 | 1/2012 | Schmotz |
| 2012/0073630 | A1 | 3/2012 | Wu |
| 2012/0079781 | A1 | 4/2012 | Koller |
| 2012/0085041 | A1 | 4/2012 | Place |
| 2012/0099943 | A1 | 4/2012 | Chiu |
| 2012/0102853 | A1 | 5/2012 | Rizzo |
| 2012/0153108 | A1 | 6/2012 | Schneider |
| 2012/0167364 | A1 | 7/2012 | Koch et al. |
| 2012/0175322 | A1 | 7/2012 | Park et al. |
| 2012/0192519 | A1 | 8/2012 | Ray |
| 2012/0193310 | A1 | 8/2012 | Fluhrer et al. |
| 2012/0201601 | A1 | 8/2012 | Rizzo |
| 2012/0223033 | A1 | 9/2012 | Molek |
| 2012/0244729 | A1 | 9/2012 | Rivera et al. |
| 2012/0248271 | A1 | 10/2012 | Zeilenga |
| 2012/0298188 | A1 | 11/2012 | West et al. |
| 2012/0299233 | A1 | 11/2012 | Header |
| 2012/0325761 | A1 | 12/2012 | Kubsch et al. |
| 2013/0011187 | A1 | 1/2013 | Schuit et al. |

(56) References Cited

U.S. PATENT DOCUMENTS

2013/0014809 A1 1/2013 Sagayama
2013/0048056 A1 2/2013 Kilgore et al.
2013/0074428 A1 3/2013 Allen
2013/0089388 A1 4/2013 Liu et al.
2013/0091692 A1 4/2013 Stanley
2013/0117973 A1 5/2013 Murasaki
2013/0118545 A1 5/2013 Bosler et al.
2013/0149030 A1 6/2013 Merhar et al.
2013/0167470 A1 7/2013 Montgomery et al.
2013/0168525 A1 7/2013 Haddock
2013/0220403 A1 8/2013 Rizzo
2013/0227833 A1 9/2013 Rizzo
2013/0263917 A1 10/2013 Hamamura
2013/0313043 A1 11/2013 Lallier
2013/0334151 A1 12/2013 Kanczuzewski et al.
2013/0340358 A1 12/2013 Danning
2014/0000681 A1 1/2014 Zhao et al.
2014/0003861 A1 1/2014 Cheung
2014/0041202 A1 2/2014 Schnitzer et al.
2014/0042286 A1 2/2014 Jaffari
2014/0069048 A1 3/2014 Ally
2014/0096462 A1 4/2014 Haddock
2014/0096463 A1 4/2014 Prentice
2014/0179133 A1 6/2014 Redel
2014/0220834 A1 8/2014 Rizzo
2014/0231605 A1 8/2014 Sharpe et al.
2014/0260068 A1 9/2014 Pendley et al.
2014/0283467 A1 9/2014 Chabas et al.
2014/0290718 A1 10/2014 Jackson, Jr.
2014/0338273 A1 11/2014 Stapleton
2014/0341645 A1 11/2014 Liu et al.
2015/0052834 A1 2/2015 Gies et al.
2015/0060620 A1 3/2015 Smeja
2015/0107168 A1 4/2015 Kobayashi
2015/0129517 A1 5/2015 Wildes
2015/0171787 A1 6/2015 Genschorek
2015/0200620 A1 7/2015 Haddock et al.
2015/0214884 A1 7/2015 Rizzo
2015/0249423 A1 9/2015 Braunstein et al.
2015/0316086 A1 11/2015 Urban
2016/0025262 A1 1/2016 Stearns et al.
2016/0043686 A1 2/2016 Hsueh
2016/0049901 A1 2/2016 Muther et al.
2016/0060869 A1 3/2016 Smeja
2016/0079909 A1 3/2016 Franklin
2016/0087576 A1 3/2016 Johansen et al.
2016/0111835 A1 4/2016 Nayar
2016/0111997 A1 4/2016 Ganshaw et al.
2016/0111998 A1 4/2016 Schmid
2016/0130815 A1 5/2016 Menegoli
2016/0160492 A1* 6/2016 Gower .................... E04B 1/388
52/202
2016/0160524 A1 6/2016 Malins
2016/0176105 A1 6/2016 Stanley
2016/0177984 A1 6/2016 Kovacs et al.
2016/0233820 A1 8/2016 Redel
2016/0268958 A1 9/2016 Wildes et al.
2016/0308487 A1 10/2016 Molina
2017/0040928 A1 2/2017 Schuit et al.
2017/0040931 A1 2/2017 Schuit
2017/0067258 A1 3/2017 Stearns et al.
2017/0073974 A1 3/2017 Kovacs
2017/0107723 A1 4/2017 Stearns et al.
2017/0237386 A1 8/2017 Stephan et al.
2017/0301265 A1 10/2017 Kyle et al.
2017/0302220 A1* 10/2017 Martin .................... H02S 20/22
2017/0302221 A1 10/2017 Jasmin
2017/0336021 A1 11/2017 Anderson
2018/0013382 A1 1/2018 Smeja
2018/0045363 A1 2/2018 Mitrovic
2018/0062570 A1 3/2018 Murakami
2018/0109014 A1 4/2018 Martin
2018/0119425 A1 5/2018 Kovacs
2018/0123505 A1 5/2018 Prat et al.
2018/0167026 A1 6/2018 Xie
2018/0323744 A1 11/2018 Hudson
2019/0013772 A1 1/2019 Bamat et al.
2019/0049151 A1 2/2019 Harris et al.
2019/0068114 A1 2/2019 Lu
2019/0106885 A1 4/2019 Stearns et al.
2019/0123460 A1 4/2019 Ash et al.
2019/0165717 A1 5/2019 Haddock et al.
2019/0178274 A1 6/2019 Katz
2019/0195252 A1 6/2019 Pryor et al.
2019/0221696 A1 7/2019 Kubo et al.
2019/0226214 A1 7/2019 Van Leuven
2019/0273460 A1 9/2019 Kovacs
2019/0285224 A1 9/2019 McKechnie et al.
2019/0326847 A1 10/2019 Zuritis
2019/0330853 A1 10/2019 Van Leuven
2019/0343085 A1 11/2019 Donado
2019/0345719 A1 11/2019 Header
2019/0363667 A1 11/2019 Braunstein et al.
2019/0372501 A1 12/2019 Wada et al.
2020/0144959 A1 5/2020 Stearns et al.
2020/0208463 A1* 7/2020 Mascarenhas .......... F16B 2/245
2020/0208658 A1 7/2020 Roman
2020/0252023 A1 8/2020 Stearns et al.
2020/0278077 A1 9/2020 Xie
2020/0313603 A1 10/2020 Uppu
2020/0313604 A1 10/2020 Harris et al.
2020/0313611 A1 10/2020 Ash et al.
2020/0318349 A1 10/2020 Stearns et al.
2020/0321763 A1 10/2020 Joshi et al.
2020/0362632 A1 11/2020 Fort
2021/0005115 A1 1/2021 Johnson
2021/0028741 A1 1/2021 Stearns et al.
2021/0067085 A1 3/2021 Stearns et al.
2021/0079947 A1 3/2021 Ash et al.
2021/0104973 A1 4/2021 Stearns et al.
2021/0111546 A1 4/2021 Varale
2021/0159843 A1 5/2021 Stearns et al.
2021/0167720 A1 6/2021 Stearns et al.
2021/0184626 A1 6/2021 Yang et al.
2021/0194157 A1 6/2021 Ash et al.
2021/0265940 A1 8/2021 Stearns et al.
2021/0376781 A1 12/2021 Stearns et al.
2021/0376782 A1 12/2021 Stearns et al.
2021/0388618 A1 12/2021 Stearns et al.
2022/0010823 A1 1/2022 Moss et al.
2022/0140771 A1 5/2022 Stearns et al.
2022/0145634 A1 5/2022 Stearns et al.
2022/0149545 A1 5/2022 Ash et al.
2022/0178586 A1 6/2022 Ash et al.
2022/0275813 A1 9/2022 Haddock
2022/0278516 A1 9/2022 Meine et al.
2023/0036926 A1 2/2023 Jovanovic et al.
2023/0090124 A1 3/2023 Haddock et al.
2023/0151834 A1 5/2023 Kovacs
2023/0170840 A1 6/2023 Stearns et al.
2023/0175737 A1 6/2023 Haddock et al.
2023/0198460 A1 6/2023 Jasmin et al.
2023/0223895 A1 7/2023 Haddock et al.
2023/0261606 A1 8/2023 Stearns et al.
2023/0336108 A1 10/2023 Morano
2023/0396208 A1 12/2023 Pedlar et al.
2023/0402958 A1 12/2023 Jasmin
2024/0022207 A1 1/2024 Jasmin et al.
2024/0097415 A1 3/2024 Ash et al.
2024/0167730 A1 5/2024 Jasmin et al.
2024/0171115 A1 5/2024 Jasmin et al.
2024/0195347 A1 6/2024 Jasmin
2024/0227688 A1 7/2024 Morano
2025/0015580 A1 1/2025 Meine
2025/0146294 A1 5/2025 Haddock et al.
2025/0154971 A1 5/2025 Haddock
2025/0155164 A1 5/2025 Leitch et al.

FOREIGN PATENT DOCUMENTS

AT 298762 5/1972
AT 509330 8/2011
AU 2005201707 11/2006
AU 2009101276 1/2010

(56) References Cited

FOREIGN PATENT DOCUMENTS

| | | | | |
|---|---|---|---|---|
| AU | 2009245849 | 6/2010 | | |
| AU | 2014362215 | 6/2015 | | |
| AU | 2017203660 | 10/2018 | | |
| AU | 2016294152 | 12/2018 | | |
| CA | 2704915 | 9/2011 | | |
| CA | 2751963 | 3/2013 | | |
| CH | 204783 | 5/1939 | | |
| CH | 388590 | 2/1965 | | |
| CH | 469159 | 2/1969 | | |
| CH | 583400 | 12/1976 | | |
| CH | 671063 | 7/1989 | | |
| CN | 201635272 | 11/2010 | | |
| CN | 202025767 | 11/2011 | | |
| CN | 202577780 | 12/2012 | | |
| CN | 103774795 | 5/2014 | | |
| CN | 203951411 | 11/2014 | | |
| CN | 104254654 | 12/2014 | | |
| CN | 105208941 | 12/2015 | | |
| CN | 206628755 | 11/2017 | | |
| CN | 206717199 | 12/2017 | | |
| CN | 206737192 | 12/2017 | | |
| CN | 206849001 | 1/2018 | | |
| CN | 108086790 | 5/2018 | | |
| CN | 108105222 | 6/2018 | | |
| CN | 108331266 | 7/2018 | | |
| CN | 208986874 | 6/2019 | | |
| CN | 305195428 | 6/2019 | | |
| CN | 305231426 | 6/2019 | | |
| CO | 6511275 | 8/2012 | | |
| DE | 298762 | 4/1916 | | |
| DE | 941690 | 4/1956 | | |
| DE | 2126082 | 12/1972 | | |
| DE | 2523087 | 11/1976 | | |
| DE | 2556095 | 6/1977 | | |
| DE | 2846451 | 5/1980 | | |
| DE | 3326223 | 4/1984 | | |
| DE | 3617225 | 11/1987 | | |
| DE | 3723020 | 1/1989 | | |
| DE | 3728831 | 1/1989 | | |
| DE | 9112788 | 12/1991 | | |
| DE | 4115240 | 10/1992 | | |
| DE | 19544689 | C1 * | 10/1996 | ............... E04B 9/02 |
| DE | 19529351 | 2/1997 | | |
| DE | 10056177 | 5/2002 | | |
| DE | 10062697 | 7/2002 | | |
| DE | 10152354 | 5/2003 | | |
| DE | 10224437 | 12/2003 | | |
| DE | 10344202 | 4/2004 | | |
| DE | 202005006951 | 8/2005 | | |
| DE | 102005002828 | 8/2006 | | |
| DE | 202006015336 | 12/2006 | | |
| DE | 102005039495 | 3/2007 | | |
| DE | 202007002252 | 4/2007 | | |
| DE | 202007002232 | 5/2007 | | |
| DE | 102007023177 | 3/2008 | | |
| DE | 202007018367 | 7/2008 | | |
| DE | 102007036206 | 2/2009 | | |
| DE | 202009010984 | 12/2009 | | |
| DE | 102008032985 | 1/2010 | | |
| DE | 102009018362 | 11/2010 | | |
| DE | 102009035996 | 11/2010 | | |
| DE | 102009040671 | 3/2011 | | |
| DE | 202011001761 | 5/2011 | | |
| DE | 202010007234 | 10/2011 | | |
| DE | 102010035804 | 3/2012 | | |
| DE | 102011100484 | 11/2012 | | |
| DE | 102011050856 | 12/2012 | | |
| DE | 202012103417 | 12/2012 | | |
| DE | 102011113289 | 3/2013 | | |
| DE | 202013002857 | 5/2013 | | |
| DE | 102013204954 | 9/2014 | | |
| DE | 202014102469 | 9/2014 | | |
| DE | 202015102936 | 9/2016 | | |
| DE | 202012013476 | 2/2017 | | |
| DE | 102017128371 | 6/2019 | | |
| EP | 0481905 | 4/1992 | | |
| EP | 0722023 | 7/1996 | | |
| EP | 0952272 | 10/1999 | | |
| EP | 1126098 | 8/2001 | | |
| EP | 1447494 | 8/2004 | | |
| EP | 1804008 | 7/2007 | | |
| EP | 2105971 | 9/2009 | | |
| EP | 2327942 | 6/2011 | | |
| EP | 2375185 | 10/2011 | | |
| EP | 2520877 | 11/2012 | | |
| EP | 2568231 | 3/2013 | | |
| EP | 2746695 | 6/2014 | | |
| EP | 2666925 | 4/2015 | | |
| EP | 2528166 | 9/2015 | | |
| EP | 3092350 | 4/2019 | | |
| EP | 3364124 | 10/2019 | | |
| EP | 3552307 | 10/2019 | | |
| EP | 3361183 | 12/2019 | | |
| EP | 4329192 | 2/2024 | | |
| FR | 469159 | 7/1914 | | |
| FR | 1215468 | 4/1960 | | |
| FR | 2468209 | 4/1981 | | |
| FR | 2515236 | 4/1983 | | |
| FR | 2638772 | 5/1990 | | |
| FR | 2697060 | 4/1994 | | |
| FR | 2793827 | 11/2000 | | |
| FR | 2950375 | 3/2011 | | |
| FR | 2958953 | 10/2011 | | |
| FR | 2971577 | 8/2012 | | |
| FR | 2983890 | 6/2013 | | |
| FR | 2997169 | 4/2014 | | |
| FR | 3074369 | 12/2019 | | |
| GB | 2149829 | 6/1985 | | |
| GB | 2169325 | A * | 7/1986 | ............ F21V 21/108 |
| GB | 2364077 | 1/2002 | | |
| GB | 2430946 | 4/2007 | | |
| GB | 2465484 | 5/2010 | | |
| GB | 2476104 | 6/2011 | | |
| JP | S56-158486 | 12/1981 | | |
| JP | H03-166452 | 7/1991 | | |
| JP | H04-73367 | 3/1992 | | |
| JP | H04-366294 | 12/1992 | | |
| JP | H05-346055 | 12/1993 | | |
| JP | H08-189150 | 7/1996 | | |
| JP | H09-177272 | 7/1997 | | |
| JP | H09-256562 | 9/1997 | | |
| JP | H11-172861 | 6/1999 | | |
| JP | 2000-120235 | 4/2000 | | |
| JP | 2000-179106 | 6/2000 | | |
| JP | 2000-234423 | 8/2000 | | |
| JP | 2000-303638 | 10/2000 | | |
| JP | 2001-193231 | 6/2001 | | |
| JP | 2001-182238 | 7/2001 | | |
| JP | 2001-303724 | 10/2001 | | |
| JP | 2002-146978 | 5/2002 | | |
| JP | 2002-180609 | 6/2002 | | |
| JP | 2003-096986 | 4/2003 | | |
| JP | 2003-155803 | 5/2003 | | |
| JP | 2003-213854 | 7/2003 | | |
| JP | 3475781 | 12/2003 | | |
| JP | 2004-060358 | 2/2004 | | |
| JP | 2004-068270 | 3/2004 | | |
| JP | 2004-092134 | 3/2004 | | |
| JP | 2004-116658 | 4/2004 | | |
| JP | 2004-124583 | 4/2004 | | |
| JP | 2004-156326 | 6/2004 | | |
| JP | 2004-264009 | 9/2004 | | |
| JP | 2004-278145 | 10/2004 | | |
| JP | 2005-171623 | 6/2005 | | |
| JP | 2005-322821 | 11/2005 | | |
| JP | 2006-057357 | 3/2006 | | |
| JP | 2006-097291 | 4/2006 | | |
| JP | 2006-144268 | 6/2006 | | |
| JP | 2009-052278 | 3/2009 | | |
| JP | 2009-179955 | 8/2009 | | |
| JP | 2009-185599 | 8/2009 | | |
| JP | 4381634 | 12/2009 | | |
| JP | 2010-196422 | 9/2010 | | |
| JP | 2011-069130 | 4/2011 | | |

(56) References Cited

FOREIGN PATENT DOCUMENTS

| | | |
|---|---|---|
| JP | 2011-185014 | 9/2011 |
| JP | 2011-236611 | 11/2011 |
| JP | 2012-144903 | 8/2012 |
| JP | 2013-083044 | 5/2013 |
| JP | 2013-136892 | 7/2013 |
| JP | 2014-034872 | 2/2014 |
| JP | 2014-047460 | 3/2014 |
| JP | 6033922 | 11/2016 |
| JP | 2018-091009 | 6/2018 |
| JP | 2018-131729 | 8/2018 |
| KR | 100957530 | 5/2010 |
| MX | 2017016056 | 8/2018 |
| NL | 2021378 | 1/2020 |
| NL | 2021379 | 1/2020 |
| NL | 2021380 | 1/2020 |
| NL | 2021740 | 5/2020 |
| PT | 3066398 | 12/2019 |
| PT | 3066399 | 12/2019 |
| WO | WO 96/08617 | 3/1996 |
| WO | WO 96/30606 | 10/1996 |
| WO | WO 97/08399 | 3/1997 |
| WO | WO 99/55982 | 11/1999 |
| WO | WO 01/39331 | 5/2001 |
| WO | WO 03/098126 | 11/2003 |
| WO | WO 2008/021714 | 2/2008 |
| WO | WO 2008/028151 | 3/2008 |
| WO | WO 2008/152748 | 12/2008 |
| WO | WO 2010/112049 | 10/2010 |
| WO | WO 2010/113003 | 10/2010 |
| WO | WO 2010/121830 | 10/2010 |
| WO | WO 2010/140878 | 12/2010 |
| WO | WO 2011/019460 | 2/2011 |
| WO | WO 2011/082730 | 7/2011 |
| WO | WO 2011/154019 | 12/2011 |
| WO | WO 2012/014203 | 2/2012 |
| WO | WO 2012/017711 | 2/2012 |
| WO | WO 2012/048056 | 4/2012 |
| WO | WO 2012/116121 | 8/2012 |
| WO | WO 2012/116777 | 9/2012 |
| WO | WO 2013/009375 | 1/2013 |
| WO | WO 2013/092428 | 6/2013 |
| WO | WO 2014/194576 | 12/2014 |
| WO | WO 2015/061113 | 4/2015 |
| WO | WO 2016/198305 | 12/2016 |
| WO | WO 2016/204941 | 12/2016 |
| WO | WO 2018/169391 | 9/2018 |
| WO | WO 2019/239024 | 12/2019 |
| WO | WO 2020/022879 | 1/2020 |
| WO | WO 2020/022880 | 1/2020 |
| WO | WO 2020/162746 | 8/2020 |
| WO | WO 2020/187472 | 9/2020 |
| WO | WO 2021/043407 | 3/2021 |
| WO | WO 2021/061866 | 4/2021 |
| WO | WO 2021/086185 | 5/2021 |
| WO | WO 2021/102062 | 5/2021 |
| WO | WO 2021/119458 | 6/2021 |
| WO | WO 2022/240909 | 11/2022 |
| WO | WO 2023/028101 | 3/2023 |
| WO | WO 2023/177662 | 9/2023 |
| WO | WO 2023/192199 | 10/2023 |

OTHER PUBLICATIONS

"ADJ Heavy Duty Lighting C-clamp," Sweetwater, 2011, 3 pages [retrieved online from: http://web.archive.org/web/20111112045516/http://www.sweetwater.com/store/detail/CClamp/].

"Aerocompact® Compactmetal TR Checklist," Aerocompact, Aug. 30, 2021, CL TR ENG EU V1, 2 pages [retrieved online from: cdn.intelligencebank.com/eu/share/8MnR/YJMd/ZBPL4/original/AEROCOMPACT_CL_TR_ENG_V1_WEB].

"Aerocompact® Compactmetal TR," Aerocompact, Sep. 2, 2021, PB TR ENG EU V1, 3 pages[retrieved online from: cdn.intelligencebank.com/eu/share/8MnR/qMBXP/VYrWa/original/AEROCOMPACT_Leaflet_TR_ENG_V1_WEB].

"Aluminum," Wikipedia, Jul. 3, 2016, 21 pages [retrieved Oct. 3, 2017 from: en.wikipedia.org/w1ki/Aluminium].

"ClampFit-H Product Sheet," Schletter GmbH, Kirchdorf, Germany, Nov. 2015, 2 pages.

"Code: The SR-EC-010," Lockseam Ltd., Received Nov. 9, 2022, Datasheet SR-EC-010 Version 2.0, 6 pages.

"CompactMETAL TR59 | TR74 Assembly Instructions," Aerocompact, Sep. 2021, 27 pages.

"ERK-TRB-C16 RiverClack Roofing Profile Interface," Enerack, 2021, 2 pages [retrieved online from: www.enerack.com/erk-trb-c16-riverclack-roofing-profile-interface-p00231p1.html].

"EZ Grip Metal Deck Mount," SunModo Corp., 2019, 1 page.

"EZ Grip Metal Deck Mount," SunModo Corp., 2019, Product page, 3 pages [retrieved online May 30, 2019 from: sunmodo.com/product/ez-grip-metal-deck-mount/#].

"Fix2000 check list," Schletter GmbH, last updated Jul. 2010, 1 page.

"Grounding Clip for Electrical Protection," ARaymond, 2016, 2 pages.

Ideematec Tracking & Mounting Systems [online], Apr. 2008, [retrieved Mar. 6, 2012], Retrieved from http://www.ideematec.de.

"Installation Instructions for Rayvolt®—Grounding clip for Framed PV Modules," ARaymond, Feb. 2016, Version 2.2, 1 page.

"Kee Walk—Roof Top Walkway," Simplified Safety, 2011, 3 pages [retrieved online from: https://web.archive.org/web/20120207115154/http://simplifiedsafety.com/solutions/keewalk-rooftop-walkway/].

"KeeLine® The Safety Solution for Horizontal Life Lines," Kee Safety, Ltd. 2012, 2 pages [retrieved online from: https://web.archive.org/web/20120305120830/http://keesafety.co.uk/products/kee_line].

"LM-KS-700," Lumax Energy, 2018, 1 page.

"LM-TBR-VL," Lumax Energy, Oct. 2018, 1 page [retrieved online from: https://lumaxenergy.co.za/wp-content/uploads/2018/12/Lumax-Energy-LM-TBR-VL.pdf/].

"Metal Roof Deck Mount Kit," SunModo Corp., Oct. 16, 2018, Product Drawing, 1 page.

"Miller Fusion Roof Anchor Post," Miller Fall Protection, 2011, 3 pages [retrieved online from: https://web.archive.org/web/20111211154954/www.millerfallprotection.com/fall-protection-products/roofing-products/miller-fusion-roof-anchor-post].

"New 'Alzone 360 system'", Arrid, 2008, 34 pages [retrieved online from: https://web.archive.org/web/20120317120735/www.arrid.com.au/?act=racking_parts].

"Non-Penetrative Clamps with Roofs," Clenergy, Dec. 2021, Datasheet, 5 pages.

"Oil Canning—Solutions," Pac-Clad, 2001, 2 pages [retrieved online from: pac-clad.com/aiapresentation/sld021.html].

"Oil Canning," Metal Construction Association, 2003, Technical Bulletin #95-1060, 2 pages.

"PV-ezRack Klip-lok Interface," Clenergy, 2020, 1 page.

"PV-ezRack SolarRoof-Black Anodized," Clenergy, 2020, 4 pages.

"REES-Snow Retention Systems, " Weerbewind, 2010, 3 pages [retrieved online from: https://web.archive.org/web/20100310075027/www.rees-oberstdorf.de/en/products/snow-retention-system.html].

"S-5! WindClamp™ Install," Metal Roof Innovations, Ltd., 2014, 1 page.

"Slot definition," Merriam-Webster Dictionary, 2022, 1 page [retrieved online Aug. 24, 2022 from www.merriam-webster.com/dictionary/slot].

"Solar mount. System," Schletter GmbH, 2012, 1 page [retrieved online from: https://web.archive.org/web/20120316154604/www.schletter.de/152-1-Solar-mounting-systems.html].

"Standing Seam Rail Free One Sheet," SunModo, Corp., 2020, 2 pages.

"Standing Seam RiverClack Clamp," Shanghai Woqin New Energy Technology Co., Ltd., 2018, 4 pages [retrieved online on Mar. 23, 2022 from: www.wochnmount.com/Details.html?product_id=36].

"SunDock™ Standing Seam Rail-Free Attachment System," SunModo Corp., 2018, 1 page.

"SunDock Standing Seam PV Mounting System Installation Manual," SunModo, 2019, Doc. No. D10160-V006, 14 pages.

"Universal Clamps Brochure for Web," Universal Clamps, 2020, 2 pages.

(56) References Cited

OTHER PUBLICATIONS

"Universal Klip-lok Interface pre-assembly with Cross Connector Clamp," Clenergy, 2020, 1 page.
"Universal Klip-lok Interface pre-assembly with Tin Interface A with ezClick module," Clenergy, 2020, 1 page.
"Wiley Grounding & Bonding Solutions," Hubbell, 2020, 2 pages [retrieved online from: www.hubbell.com/wiley/en/grounding-and-bonding].
"Wind Clamps for Metal Roofs," Metal Roof Innovations, Ltd., 2017, Version 081717, 2 pages.
"Wind Clamp Ultra DEK," Metal Roof Innovations, Ltd., Mar. 7, 2011, Drawing No. WC14-A-0-A_CCD, 1 page.
"Wind Clamp Double LOK," Metal Roof Innovations, Ltd., Mar. 7, 2011, Drawing No. WC15-A-0-A_CCD, 1 page.
Gallo "Oil-Canning," Metal Roofing Alliance, Ask-the-experts forum, Jun. 7, 2005, 4 pages [retrieved online from: www.metalroofingalliance.net/v2/forums/printview.cfm?action=mboard.members/viewmessages&ForumTopicID=4921&ForumCategoryID=1].
Haddock "History and Materials," Metalmag, Metal roofing from A (Aluminum) to Z (Zinc)—Part I, Sep./Oct. 2001, 4 pages.
Haddock "Metallic Coatings for Carbon Steel," Metalmag, Metal roofing from a (Aluminum) to Z (Zinc)—Part II, Nov./Dec. 2001, 8 pages.
International Search Report and Written Opinion for International (PCT) Patent Application No. PCT/US17/59065, dated Jan. 29, 2018 11 pages.
International Preliminary Report on Patentability for International (PCT) Patent Application No. PCT/US17/59065, dated May 9, 2019 7 pages.
Official Action for U.S. Appl. No. 15/798,023, dated Aug. 27, 2018 21 pages.
Official Action for U.S. Appl. No. 15/798,023, dated Dec. 14, 2018 26 pages.
Official Action for U.S. Appl. No. 15/798,023, dated Jun. 12, 2019 25 pages.
Notice of Allowance for U.S. Appl. No. 15/798,023, dated Dec. 6, 2019 10 pages.
Corrected Notice of Allowability for U.S. Appl. No. 15/798,023, dated Apr. 7, 2020 10 pages.
Official Action for U.S. Appl. No. 16/866,080, dated Sep. 18, 2020 8 pages.
Official Action for U.S. Appl. No. 16/866,080, dated Jan. 1, 2021 6 pages.
Official Action for U.S. Appl. No. 17/398,146, dated Aug. 8, 2022 5 pages Restriction Requirement.
Official Action for U.S. Appl. No. 17/398,146, dated Dec. 8, 2022 19 pages.
Notice of Allowance for U.S. Appl. No. 17/398,146, dated Jun. 12, 2023 9 pages.
"MLPE Mount," Unirac, Dec. 2016, 1 page.
"QRail® System, Installation Manual," Quick Mount PV, Jul. 2019, Rev. 4.2, 48 pages.
"Rail System," Pegasus Solar, 2021, 2 pages.
"ProteaBracket™ Install Instructions," Metal Roof Innovations, Ltd., 2022, 2 pages.
"ProteaBracket™ Brochure," Metal Roof Innovations, Ltd., 2019, 2 pages.
U.S. Appl. No. 15/471,179, filed Mar. 28, 2017 now U.S. Pat. No. 10,053,856.
U.S. Appl. No. 15/663,081, filed Jul. 28, 2017 now U.S. Pat. No. 10,443,896.
U.S. Appl. No. 16/539,960, filed Aug. 13, 2019 now U.S. Pat. No. 10,859,292.
U.S. Appl. No. 17/110,621, filed Dec. 3, 2020 now U.S. Pat. No. 11,573,033.
U.S. Appl. No. 18/106,104, filed Feb. 6, 2023.
U.S. Appl. No. 15/798,023, filed Oct. 30, 2017 now U.S. Pat. No. 10,640,980.
U.S. Appl. No. 16/866,080, filed May 4, 2020 now U.S. Pat. No. 11,085,188.
U.S. Appl. No. 17/398,146, filed Aug. 10, 2021 now U.S. Pat. No. 11,808,043.
U.S. Appl. No. 16/360,923, filed Mar. 21, 2019 now U.S. Pat. No. 10,903,785.
U.S. Appl. No. 29/845,330, filed Jul. 6, 2022.
U.S. Appl. No. 18/347,812, filed Jul. 6, 2023.
U.S. Appl. No. 29/877,872, filed Jun. 13, 2023.
U.S. Appl. No. 29/877,876, filed Jun. 13, 2023.
U.S. Appl. No. 17/156,469, filed Jan. 22, 2021 now U.S. Pat. No. 11,616,468.
U.S. Appl. No. 18/125,006, filed Mar. 22, 2023.
U.S. Appl. No. 16/714,060, filed Dec. 13, 2019 now U.S. Pat. No. 10,948,002.
U.S. Appl. No. 17/199,947, filed Mar. 12, 2021 now U.S. Pat. No. 11,668,332.
U.S. Appl. No. 18/195,273, filed May 9, 2023.
U.S. Appl. No. 13/720,461, filed Dec. 19, 2012.
U.S. Appl. No. 15/628,927, filed Jun. 21, 2017 now U.S. Pat. No. 10,634,175.
U.S. Appl. No. 16/824,651, filed Mar. 19, 2020 now U.S. Pat. No. 11,333,179.
U.S. Appl. No. 17/745,528, filed May 16, 2022.
U.S. Appl. No. 12/855,850, filed Aug. 13, 2010 now U.S. Pat. No. 10,054,336.
U.S. Appl. No. 12/856,827, filed Aug. 16, 2010 now U.S. Pat. No. 9,920,958.
U.S. Appl. No. 12/856,844, filed Aug. 16, 2010 now U.S. Pat. No. 8,627,617.
U.S. Appl. No. 16/106,299, filed Aug. 21, 2018 now U.S. Pat. No. 10,502,457.
U.S. Appl. No. 08/383,477, filed Feb. 2, 1995.
U.S. Appl. No. 08/285,280, filed Aug. 1, 1994 now U.S. Pat. No. 5,557,903.
U.S. Appl. No. 07/912,845, filed Jul. 13, 1992 now U.S. Pat. No. 5,228,248.
U.S. Appl. No. 08/091,176, filed Jul. 13, 1993 now U.S. Pat. No. 5,483,772.
U.S. Appl. No. 08/482,274, filed Jun. 7, 1995 now U.S. Pat. No. 5,715,640.
U.S. Appl. No. 08/987,368, filed Dec. 9, 1997 now U.S. Pat. No. 5,983,588.
U.S. Appl. No. 09/312,013, filed May 14, 1999 now U.S. Pat. No. 6,164,033.
U.S. Appl. No. 09/698,358, filed Oct. 27, 2000.
U.S. Appl. No. 10/118,057, filed Apr. 8, 2002 now U.S. Pat. No. 6,718,718.
U.S. Appl. No. 10/824,320, filed Apr. 13, 2004.
U.S. Appl. No. 08/335,987, filed Nov. 8, 1994 now U.S. Pat. No. 5,694,721.
U.S. Appl. No. 08/336,288, filed Nov. 8, 1994 now U.S. Pat. No. 5,491,931.
U.S. Appl. No. 09/313,105, filed May 17, 1999 now U.S. Pat. No. 6,536,729.
U.S. Appl. No. 09/313,103, filed May 17, 1999 now U.S. Pat. No. 6,470,629.
U.S. Appl. No. 09/758,805, filed Jan. 11, 2001.
U.S. Appl. No. 10/746,546, filed Dec. 23, 2003 now U.S. Pat. No. 7,100,338.
U.S. Appl. No. 10/746,596, filed Dec. 23, 2003 now U.S. Pat. No. 7,013,612.
U.S. Appl. No. 10/818,469, filed Apr. 5, 2004.
U.S. Appl. No. 10/823,410, filed Apr. 13, 2004 now U.S. Pat. No. 7,703,256.
U.S. Appl. No. 12/767,983, filed Apr. 27, 2010.
U.S. Appl. No. 12/960,679, filed Dec. 6, 2010.
U.S. Appl. No. 11/325,704, filed Jan. 5, 2006.
U.S. Appl. No. 11/425,338, filed Jun. 20, 2006.
U.S. Appl. No. 12/707,724, filed Feb. 18, 2010.
U.S. Appl. No. 11/759,172, filed Jun. 6, 2007 now U.S. Pat. No. 7,758,011.
U.S. Appl. No. 12/832,281, filed Jul. 8, 2010 now U.S. Pat. No. 8,430,372.
U.S. Appl. No. 13/857,759, filed Apr. 5, 2013.

(56) References Cited

OTHER PUBLICATIONS

U.S. Appl. No. 14/697,387, filed Apr. 27, 2015.
U.S. Appl. No. 12/629,179, filed Dec. 2, 2009.
U.S. Appl. No. 12/542,132, filed Aug. 17, 2009 now U.S. Pat. No. 8,312,678.
U.S. Appl. No. 13/667,816, filed Nov. 2, 2012 now U.S. Pat. No. 8,656,649.
U.S. Appl. No. 14/153,925, filed Jan. 13, 2014 now U.S. Pat. No. 9,222,263.
U.S. Appl. No. 13/403,463, filed Feb. 23, 2012 now U.S. Pat. No. 8,833,714.
U.S. Appl. No. 14/444,405, filed Jul. 28, 2014.
U.S. Appl. No. 14/500,919, filed Sep. 29, 2014 now U.S. Pat. No. 9,611,652.
U.S. Appl. No. 15/452,388, filed Mar. 7, 2017.
U.S. Appl. No. 15/621,092, filed Jun. 13, 2017 now U.S. Pat. No. 10,077,562.
U.S. Appl. No. 15/621,739, filed Jun. 13, 2017 now U.S. Pat. No. 10,106,987.
U.S. Appl. No. 16/129,606, filed Sep. 12, 2018 now U.S. Pat. No. 10,731,355.
U.S. Appl. No. 16/592,521, filed Oct. 3, 2019 now U.S. Pat. No. 11,035,126.
U.S. Appl. No. 17/347,291, filed Jun. 14, 2021 now U.S. Pat. No. 11,885,139.
U.S. Appl. No. 18/425,712, filed Jan. 29, 2024.
U.S. Appl. No. 14/030,615, filed Sep. 18, 2013.
U.S. Appl. No. 14/005,784, filed Jun. 13, 2014 now U.S. Pat. No. 9,530,916.
U.S. Appl. No. 15/386,911, filed Dec. 21, 2016.
U.S. Appl. No. 14/205,613, filed Mar. 12, 2014 now U.S. Pat. No. 9,147,785.
U.S. Appl. No. 14/840,206, filed Aug. 31, 2015 now U.S. Pat. No. 9,608,559.
U.S. Appl. No. 15/470,533, filed Mar. 27, 2017 now U.S. Pat. No. 10,103,682.
U.S. Appl. No. 16/139,853, filed Sep. 24, 2018.
U.S. Appl. No. 16/754,519, filed Apr. 8, 2020 now U.S. Pat. No. 11,774,143.
U.S. Appl. No. 18/479,610, filed Oct. 2, 2023.
U.S. Appl. No. 10/810,114, filed Mar. 25, 2004 now U.S. Pat. No. 7,513,080.
U.S. Appl. No. 13/545,808, filed Jul. 10, 2012.
U.S. Appl. No. 13/724,976, filed Dec. 21, 2012 now U.S. Pat. No. 9,086,185.
U.S. Appl. No. 14/789,714, filed Jul. 1, 2015.
U.S. Appl. No. 13/712,474, filed Dec. 12, 2012 now U.S. Pat. No. 8,844,234.
U.S. Appl. No. 14/469,153, filed Aug. 26, 2014.
U.S. Appl. No. 13/965,441, filed Aug. 13, 2013 now U.S. Pat. No. 8,925,263.
U.S. Appl. No. 14/558,356, filed Dec. 2, 2014 now U.S. Pat. No. 9,306,490.
U.S. Appl. No. 16/821,885, filed Mar. 17, 2020 now U.S. Pat. No. 11,041,310.
U.S. Appl. No. 17/353,483, filed Jun. 21, 2021 now U.S. Pat. No. 11,788,291.
U.S. Appl. No. 17/203,481, filed Mar. 16, 2021 now U.S. Pat. No. 11,352,793.
U.S. Appl. No. 17/833,252, filed Jun. 6, 2022 now U.S. Pat. No. 11,739,529.
U.S. Appl. No. 18/457,101, filed Aug. 28, 2023.
U.S. Appl. No. 17/203,483, filed Mar. 16, 2021 now U.S. Pat. No. 11,512,474.
U.S. Appl. No. 18/070,135, filed Nov. 28, 2022.
U.S. Appl. No. 17/371,888, filed Jul. 9, 2021.
U.S. Appl. No. 29/812,325, filed Oct. 20, 2021.
U.S. Appl. No. 29/874,164, filed Apr. 14, 2023.
U.S. Appl. No. 29/911,242, filed Aug. 30, 2023.
U.S. Appl. No. 29/924,678, filed Jan. 19, 2024.
U.S. Appl. No. 29/909,779, filed Aug. 10, 2023.
U.S. Appl. No. 29/911,713, filed Sep. 7, 2023.
"6 Pcs Solar Panel Mid Clamps, Aluminum Solar Panel Brackets Roof Solar Mid Clamp Mounting Accessories Solar Mid Clamp for Solar Panel Mounting," Amazon, Feb. 14, 2023, 6 pages [retrieved online Mar. 27, 2024 from: tinyurl.com/45tunvth].
"Renusol 420082 Mid Clamp (G)," TradeSparky, 2024, 6 pages [retrieved online Mar. 27, 2024 from: www.tradesparky.com/solarsparky/mounting/reusol/mids/renusol-420082-mid-clamp-g].
"Standing Seam Metal Roof Solar Clamps," Mibet Energy, 2021, 13 pages [retrieved online Mar. 27, 2024 from: www.mbt-energy.com/products/roof-pv/list-1.html].
"Aluminium Alloy Roof Mounting Clamp Bracket," Amazon.com, posted Jan. 5, 2020, 3 pages [retrieved online Apr. 11, 2025 from: www.amazon.com/Aexit-Aluminium-Diamond-Mounting-Bracket/dp/B07MLF4BWJ].
Aluminum Roof Mount clamp down with Fastening Rail, DH Gate, 2025, 5 pages [retrieved online from: www.dhgate.com/product/solar-panel-module-aluminum-bracket-rail/963547197.html?skuId=1239162678779494408].
"Mini C Clamps," Amazon.com, posted Dec. 1, 2021, 12 pages [retrieved online Apr. 11, 2025 from: www.amazon.com/Stainless-0-83-Inch-Mounting-Universal/dp/B09MTHNCDW?ref_=ast_sto_dp&th=1].
Solar System Panel Mounting Structure Roof Brackets, Hina, 2025, 5 pages [retrieved online from: www.hainafastener.com/Stainless-Steel-Metal-Adjustable-Mount-Bracket-PV-Bracket-Solar-System-Panel-Mounting-Structure-Roof-Brackets-Aluminum-Bracket-Tile-Roof-Bracket-Solar-Brackets-pd40964455.html].
Sustainable 8 Panel Solar Mounting Kit, Sustainable.co.za, 2025, 7 pages [retrieved online from: www.sustainable.co.za/products/sustainable-8-panel-solar-mounting-kit].

* cited by examiner

METAL PANEL ELECTRICAL BONDING CLIP

CROSS-REFERENCE TO RELATED APPLICATIONS

This patent application is a divisional of U.S. patent application Ser. No. 17/398,146, entitled "METAL PANEL ELECTRICAL BONDING CLIP," filed on Aug. 10, 2021, now U.S. Pat. No. 11,808,043 which issued on Nov. 7, 2023, which is a continuation of U.S. patent application Ser. No. 16/866,080, entitled "METAL PANEL ELECTRICAL BONDING CLIP," filed on May 4, 2020, now U.S. Pat. No. 11,085,188 which issued on Aug. 10, 2021, which is a continuation of U.S. patent application Ser. No. 15/798,023, entitled "METAL PANEL ELECTRICAL BONDING CLIP," filed on Oct. 30, 2017, now U.S. Pat. No. 10,640,980 which issued on May 5, 2020, which claims the benefit of U.S. Provisional Patent Application Ser. No. 62/415,355, entitled "METAL PANEL ELECTRICAL BONDING CLIP," filed on Oct. 31, 2016, and the entire disclosure of each of which is hereby incorporated herein by reference.

FIELD

The present invention generally relates to metal panel assemblies for building surfaces and, more particularly, to electrically grounding such panel assemblies.

BACKGROUND

Metal panels are being increasingly used to define building surfaces such as roofs and sidewalls. One type of metal panel is a standing seam panel, where portions of adjacent standing seam panels of the building surface are interconnected/nested in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that increasing the number of locations where a metal panel building surface is punctured may increase the potential for leakage and/or corrosion.

Electrical equipment of various types may be installed on a panel assembly defined by a plurality of interconnected metal panels. It is possible that the panel assembly could be energized by such electrical equipment.

SUMMARY

The present invention is embodied by a clip that may be installed on a metal panel assembly to electrically connect a pair of adjacent metal panels of this panel assembly. Hereafter such a clip may be referred to herein as an electrical bonding clip (to electrically "bond" two metal panels together—to electrically interconnect or provide an electrical path between these two adjacent metal panels). Generally, the electrical bonding clip is configured to simultaneously engage each metal panel of a pair of adjacent metal panels. In one embodiment the electrical bonding clip is installed in a first orientation on the panel assembly (e.g., a vertical orientation (e.g., orthogonal to a pitch of the overall panel assembly); where a closed end of the electrical bonding clip is at least generally vertically disposed/oriented relative to the overall panel assembly; where the electrical bonding clip is installed on interconnected portions of adjacent panels from the panel assembly, such as on a standing seam). Another embodiment has the electrical bonding clip being installed in a second orientation on the panel assembly, where this second orientation is different from the noted first orientation (e.g., a horizontal orientation (e.g., parallel to a pitch of the overall panel assembly); where a closed end of the electrical bonding clip is at least generally horizontally disposed/oriented relative to the overall panel assembly; where one portion of the electrical bonding clip engages the upper and lower surface of only one metal panel, where another portion of this same electrical bonding clip engages only the upper and lower surfaces of an adjacent metal panel, and where an intermediate portion of the electrical bonding clip extends between these two panel-engaging portions and is disposed on only one side (e.g., an underside) of the panel assembly). The present invention encompasses such an electrical bonding clip, alone/individually or as incorporated by a panel assembly that includes a plurality of interconnected metal panels.

A first aspect of the present invention is directed to a panel assembly having a first metal panel, a second metal panel, and an electrical bonding clip. The first and second metal panels include first and second edge portions, respectively, with a standing seam being defined by the interconnection of the first and second edge portions. The electrical bonding clip engages at least part of the first metal panel and also engages at least part of the second metal panel to provide an electrical connection or path between the first and second metal panels.

A number of feature refinements and additional features are applicable to the first aspect of the present invention. These feature refinements and additional features may be used individually or in any combination. The following discussion is applicable to this first aspect. Unless otherwise noted herein and with regard to the electrical bonding clip being in its installed configuration for the panel assembly: 1) a horizontal or lateral dimension coincides with a width of the standing seam, where the lateral dimension will typically be oriented so as to be at a constant elevation proceeding across a sloped roofing surface that incorporates the panel assembly; 2) a longitudinal dimension is orthogonal to the lateral dimension and coincides with a length of the standing seam, including where the length dimension of the standing seam is significantly greater than the width dimension of the standing seam, and where the longitudinal dimension will typically coincide with/match a pitch of a sloped roofing surface that incorporates the panel assembly; and 3) a vertical or height dimension is orthogonal to a reference plane that contains each of the lateral dimension and the longitudinal dimension (e.g., orthogonal to a pitch of the overall panel assembly).

The standing seam defined by the interconnection of the first and second edge portions of the first and second metal panels, respectively, may be of any appropriate configuration. For instance, the standing seam may be in the form of a hollow seam rib of any appropriate configuration (e.g., having a pair of rib sidewalls that are separated from one another by an open space). The standing seam may also be of a single lock/fold configuration or a double lock/fold configuration.

The first metal panel and the second metal panel each may include a pair of edge portions (or side edge portions or longitudinal edge portions) that are oppositely disposed and spaced from one another (e.g., spaced in the noted lateral dimension). The first metal panel and the second metal panel each may include a pair of ends (or lateral edges) that are oppositely disposed and spaced from one another (e.g., spaced in the noted longitudinal dimension). Each edge portion for both the first metal panel and the second metal panel extends between the two ends of its corresponding panel. A standing seam that is collectively by interconnected edge portions of a pair of adjacently disposed panels of the panel assembly may be characterized as being disposed/ oriented orthogonally to the two ends (or lateral edges) of each of these metal panels.

The electrical bonding clip may be mounted on the standing seam, for instance so as to simultaneously engage adjacently disposed/interfacing portions of the first and second metal panels that are part of the standing seam (e.g., the electrical bonding clip may engage overlapping portions of the first metal panel and the second metal panel that define at least part of the standing seam). The electrical bonding clip may also be configured and installed such that: 1) a first portion of the electrical bonding clip engages the upper and lower surface of only the first metal panel and on a first side of the standing seam in/relative to the lateral dimension; 2) a second portion of the electrical bonding clip engages the upper and lower surface of only the second metal panel and on a second side of the standing seam in/relative to the lateral dimension, where the first and second sides of the standing seam are opposite of one another; and 3) an intermediate portion of the electrical bonding clip extends between the noted first and second portions and is disposed on only one side (e.g., an underside) of the panel assembly, including where this intermediate portion is engaged with the panel assembly and/or where this intermediate portion is actually spaced from the panel assembly.

Any appropriate electrically-conductive material or combination of materials (e.g., stainless steel; a conductive metal or metal alloy) may be used to form the electrical bonding clip. One embodiment has the electrical bonding clip being of an integral construction such that there is not a joint of any kind between any adjacent portions of the electrical bonding clip. One embodiment has the entirety of the electrical bonding clip being formed of an electrically-conductive metal or electrically-conductive metal alloy.

The electrical bonding clip may be characterized as including at least one clip section, such as a first clip section. Each clip section (and including the first clip section) for the electrical bonding clip may include a first clip member and a second clip member that are disposed in opposing relation to one another, with a living hinge interconnecting the first clip member and the second clip member. This living hinge may define a “closed-end” for the first clip section, including where the first clip section includes an “open-end” that is opposite of this closed-end, and where the “open-end” is defined at least in part by the first clip member (e.g., a free end thereof) and the second clip member (e.g., a free end thereof) being movable relatively away from one another (e.g., by a pivotal or pivotal-like motion about the living hinge). A length dimension of the living hinge (or stated another way the axis about which the first clip member may move relative to its corresponding second clip member) may coincide with the vertical dimension in the installed configuration for the electrical bonding clip, or may coincide with the lateral dimension in the installed configuration for the electrical bonding clip.

The first clip member may be biased toward the second clip member. Moving the first clip member away from and relative to the second clip member (e.g., the respective free ends thereof) may be opposed by at least one biasing force (e.g., by an elastic deflection of the above-noted living hinge). One embodiment (e.g., where the electrical bonding clip has a single clip section) has a first surface of the first clip member facing or projecting toward a second surface of the second clip member that faces the first clip member (e.g., the first surface of the first clip member and the second surface of the second clip member may face or project toward one another). The first surface of the first clip member may include at least one first grounding projection of any appropriate type/configuration. The second surface of the second clip member may include at least one second grounding projection of any appropriate type/configuration. Each first grounding projection incorporated by the first clip member, as well as each second grounding projection incorporated by the second clip member, may be configured to break a coating on the panel assembly, for instance when installing the electrical bonding clip on the panel assembly. In the case where the electrical bonding clip includes a single clip section, the electrical path may be from the first metal panel to the first clip member (including via one or more grounding projections of the first clip member that engages the first metal panel), from the first clip member to the second clip member via the noted living hinge (or more generally a closed end for the electrical bonding clip), and from the second clip member to the second metal panel (including via one or more grounding projections of the second clip member that engages the second metal panel).

One embodiment of the electrical bonding clip accommodates its installation directly on a standing seam of the panel assembly, for instance on overlapping portions of the first metal panel and the second metal panel that define at least part of the standing seam. The electrical bonding clip may engage a portion of the standing seam that is oriented in the vertical dimension in the installed configuration for the electrical bonding clip. A closed end of the electrical bonding clip may be disposed over a portion of one end of the first metal panel and over a portion of one end of the second metal panel that are adjacent to one another in the panel assembly. Such an electrical bonding clip may include a single clip section in accordance with the foregoing, for instance the above-noted first clip section, and including without limitation where at least one grounding projection of the first clip member engages part of the first metal panel that defines at least part of the standing seam and where at least one grounding projection of the second clip member engages part of the second metal panel that defines at least part of this same standing seam.

The electrical bonding clip may include a plurality of clip sections, for instance a first clip section and a second clip section. These first and second clip sections may be spaced from one another in the lateral dimension for the installed configuration of the electrical bonding clip. The electrical bonding clip may be configured such that the first clip section engages only the first metal panel and such that the second clip section engages only the second metal panel. The first clip section may be disposed on a first side of the standing seam (e.g., in/relative to the lateral dimension), and the second clip section may be disposed on a second side of this same standing seam (e.g., in/relative to the lateral dimension). As such, the first and second clip sections may be characterized as being disposed on opposite sides of the standing seam. The first clip section may be disposed adjacent to or may be spaced from the first side of the standing seam, while the second clip section may be disposed adjacent to or may be spaced from the second side of this same standing seam.

The first clip member for each of the first and second clip sections may include a first surface that faces its corresponding second clip member, while the second clip member for each of the first and second clip sections may include a second surface that faces its corresponding first clip member (e.g., the first surface of the first clip member and the second surface of the corresponding second clip member, for each of the first and second clip sections, may face or project toward one another). In one embodiment, the first surface of the first clip member for each of the first clip section and the second clip section includes at least one grounding projection of any appropriate type/configuration, while the second surface of the second clip member for each of the first clip section and the second clip section lacks a grounding projection of any type/configuration. The installed configuration for such an electrical bonding clip may be such that the first clip member for the first clip section is disposed on and engages an underside of the first metal panel (the second clip member of the first clip section being disposed on and engaging an exterior side of the first metal panel), and such that the first clip member for the second clip section is disposed on and engages an underside of the second metal panel (the second clip member of the second clip section being disposed on and engaging an exterior side of the second metal panel).

An electrical bonding clip including a first clip section and a second clip section that are spaced from one another may still be structurally interconnected by the structure of the electrical bonding clip. Such an electrical bonding clip may include a "plate" or a "base." One end portion of this plate/base (e.g., a first part of the plate/base) may define part of the first clip section (e.g., the first clip member for the first clip section), while an opposite end portion of this same plate/base (e.g., a second part of the plate/base) may define part of the second clip section (e.g. the first clip member for the second clip section). A third part of the plate/base may extend between the first part of the plate/base and the second part of the plate/base. Notwithstanding the characterization of the plate/base having these first, second, and third parts, the plate may be an integral structure (e.g., no joint between the noted first and third parts of the plate/base, and no joint between the noted second and third parts of the plate/base). Another characterization for an electrical bonding clip having a first clip section and a second clip section that are spaced from one another and a plate/base is that the first clip member for the first clip section is disposed at one end of the plate/base in the lateral dimension for the installed configuration of the electrical bonding clip, while the first clip member for the second clip section is disposed at an opposite end of the plate/base in this same lateral dimension.

A plate/base for the electrical bonding clip in accordance with any of the foregoing may be disposed on an underside of the panel assembly (e.g., a side of the panel assembly that is opposite of the side that is exposed to the environment/elements) for the installed configuration of the electrical bonding clip. In the case where the electrical bonding clip includes a first clip section and a second clip section that are spaced from one another, the electrical path may be from the first metal panel to the first clip member of the first clip section (including via one or more grounding projections of the first clip member of this first clip section that engages the underside of the first metal panel), from the first clip member of the first clip section to the first clip member of the second clip section via the intermediate portion of the plate/base, and from the first clip member of the second clip section to the second metal panel (including via one or more grounding projections of the first clip member of this second clip section that engages the second metal panel).

One or more aspects of the present invention are also addressed by the following paragraphs:

1. A panel assembly, comprising a first metal panel comprising a first edge portion;

second metal panel comprising a second edge portion;

a standing seam defined by an interconnection of said first edge portion and said second edge portion of said first metal panel and said second metal panel, respectively; and an electrical bonding clip that engages at least part of said first metal panel and that engages at least part of said second metal panel, wherein said electrical bonding clip provides an electrical connection between said first metal panel and said second metal panel.

2. The panel assembly of paragraph 1, wherein said electrical bonding clip is formed entirely of stainless steel.

3. The panel assembly of paragraph 1, wherein said electrical bonding clip is formed entirely of a conductive metal or metal alloy.

4. The panel assembly of any of paragraphs 1-3, wherein said electrical bonding clip is of an integral construction.

5. The panel assembly of any of paragraphs 1-4, wherein said electrical bonding clip comprises a first clip member, a second clip member disposed in opposing relation to said first clip member, and a living hinge between said first clip member and said second clip member.

6. The panel assembly of paragraph 5, wherein said first clip member is biased toward said second clip member.

7. The panel assembly of any of paragraphs 5-6, wherein said first clip member comprises a first surface that faces said second clip member and that comprises a first grounding projection, and wherein said second clip member comprises a second surface that faces said first clip member and that comprises a second grounding projection.

8. The panel assembly of paragraph 7, wherein each of said first grounding projection and said second grounding projection is configured to break a coating of said panel assembly.

9. The panel assembly of any of paragraphs 1-8, wherein said electrical bonding clip engages overlapping portions of said first metal panel and said second metal panel that define at least part of said standing seam.

10. The panel assembly of any of paragraphs 1-9, wherein said electrical bonding clip engages said standing seam.

11. The panel assembly of any of paragraphs 1-10, wherein said electrical bonding clip engages a section of said standing seam that is disposed orthogonal to a pitch defined by said panel assembly.

12. The panel assembly of any of paragraphs 1-4, wherein said electrical bonding clip comprises first and second clip sections, wherein said first clip section engages only said first metal panel, and wherein said second clip section engages only said second metal panel.

13. The panel assembly of paragraph 12, wherein said first clip section engages said first metal panel at a location that is spaced from said standing seam and said second clip section engages said second metal panel at a location that is spaced from said standing seam.

14. The panel assembly of paragraph 13, wherein said standing seam is located between said first clip section and said second clip section in a lateral dimension that is orthogonal to a length dimension of said standing seam that coincides with a pitch of said panel assembly.

15. The panel assembly of any of paragraphs 12-14, wherein each of said first clip section and said second clip section comprise a first clip member, a second clip member disposed in opposing relation to its corresponding said first clip member, and a living hinge between said first clip member and its corresponding said second clip member.

16. The panel assembly of paragraph 15, wherein said first clip member is biased toward its corresponding said second clip member for each of said first and second clip sections.

17. The panel assembly of any of paragraphs 15-16, wherein said first clip member for each of said first and second clip sections comprises a first surface that faces its corresponding said second clip member and that comprises at least one first grounding projection, wherein said second clip member for each of said first and second clip sections comprises a second surface that faces its corresponding said first clip member, and wherein said second surface of said second clip member for each of said first and second clip sections lacks any type of grounding projection.

18. The panel assembly of paragraph 17, wherein each said first grounding projection is configured to break a coating of said panel assembly.

19. The panel assembly of any of paragraphs 17-18, wherein said first clip member for said first clip section is disposed on and engages an underside of said first metal panel, and wherein said first clip member for said second clip section is disposed on and engages an underside of said second metal panel.

20. The panel assembly of any of paragraphs 15-19, wherein electrical bonding clip comprises a plate which in comprises said first clip member for said first clip section and said first clip member for said second clip section.

21. The panel assembly of paragraph 20, wherein said first clip member for said first clip section is disposed at one end of said plate in a lateral dimension that is orthogonal to a length dimension of said standing seam that coincides with a pitch of said panel assembly, wherein said first clip member for said second clip section is disposed at an opposite end of said plate in said lateral dimension, and wherein said plate comprises an intermediate portion that is located between said first clip member for said first clip section and said first clip member for said second clip section in said lateral dimension and that is disposed under said standing seam.

22. The panel assembly of any of paragraphs 12-14, wherein said electrical bonding clip comprises a plate, wherein a first part of said plate defines one part of said first clip section, and wherein a second part of said plate defines one part of said second clip section.

23. The panel assembly of paragraph 22, wherein said plate is disposed on an underside of said panel assembly.

24. The panel assembly of any of paragraphs 22-23, wherein said plate further comprises a third part that is located between said first part and said second part in a lateral dimension that is orthogonal to a length dimension of said standing seam that coincides with a pitch of said panel assembly, and wherein said third part of said plate is disposed under said standing seam.

DETAILED DESCRIPTION

Figure 1:
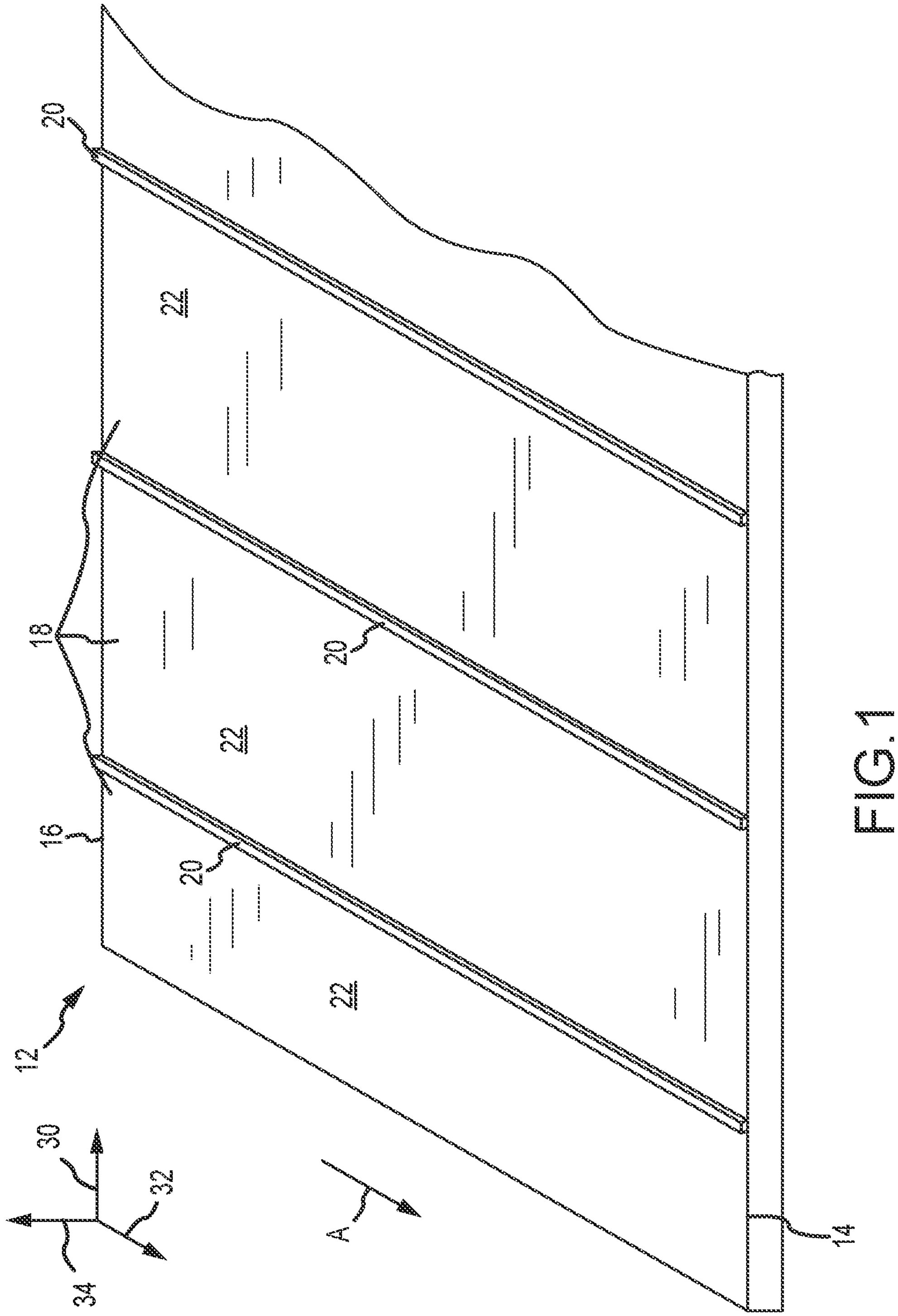
FIG.1 (Prior Art)
FIG. 1 is a perspective view of a prior art roofing surface defined by a plurality of interconnected panels, where each interconnection of adjacent pairs of panels defines a standing seam.

FIG. 1 illustrates a representative building/roofing surface 12. Generally, the roofing surface 12 may be defined in any appropriate manner and may be of any appropriate configuration. For instance, the roofing surface 12 may include one or more roofing sections, each of which may be of any appropriate pitch/slope and/or shape/size. The roofing surface 12 shown in FIG. 1 at least generally slopes downwardly in a direction denoted by arrow A from a peak 16 of the roofing surface 12 to an edge 14 of the roofing surface 12. Multiple panels 18 (e.g., metal panels) collectively define the roofing surface 12. The interconnection of each adjacent pair of panels 18 in the illustrated embodiment defines a standing seam 20 (only schematically illustrated in FIG. 1).

The standing seams 20 may at least generally proceed in the direction of or along the slope or pitch of the roofing surface 12 (e.g., the pitch of the length dimension of the standing seams 20 may match the pitch of the corresponding portion of the overall roofing surface 12). Each panel 18 includes at least one base section 22 that is at least generally flat or planar and that is disposed between each adjacent pair of standing seams 20 on the roofing surface 12. Each panel 18 could include one or more crests, minor ribs, intermediate ribs, partial ribs, striations, fluting, or flutes between its corresponding pair of standing seams 20 so as to provide multiple base sections 22 on each panel 18 (not shown).

The panels 18 may be of any appropriate configuration so to allow them to be interconnected or nested in a manner that defines a standing seam 20, and the standing seams 20 may be disposed in any appropriate orientation relative to the base sections 22 of the panels 18 that define the standing seam 20. Generally, each standing seam 20 is a protrusion of some sort that is defined at least in part by an adjacent pair of metal panels 18. For instance, the standing seams 20 may be characterized as at least initially extending orthogonally (e.g., perpendicularly) relative to the base sections 22 of the corresponding panels 18 (or relative to a pitch of the corresponding portion of the roofing surface 12). The illustrated standing seams 20 may be characterized as having a vertical end section, or as being of a vertical standing seam configuration. However, the end sections of the various standing seams 20 could also have portions that are horizontally disposed (e.g., at least generally parallel with the base sections 22 of the corresponding panels 18; at least generally parallel to a pitch of the corresponding portion of the roofing surface 12), or as being of a horizontal standing seam configuration.

FIG. 1 also shows a lateral dimension 30, a longitudinal dimension 32, and a vertical dimension 34. As such and in accordance with these coordinates: 1) the standing seams 20 are spaced from one another in the lateral dimension 30; 2) the length of the standing seams 20 is disposed in the longitudinal dimension 32 (e.g., extending between the peak 16 and edge 14 of the roofing surface 12); and 3) at least part of the standing seams 20 protrude in the vertical dimension 34 relative to adjacently-disposed base sections 22.

Figure 2A:
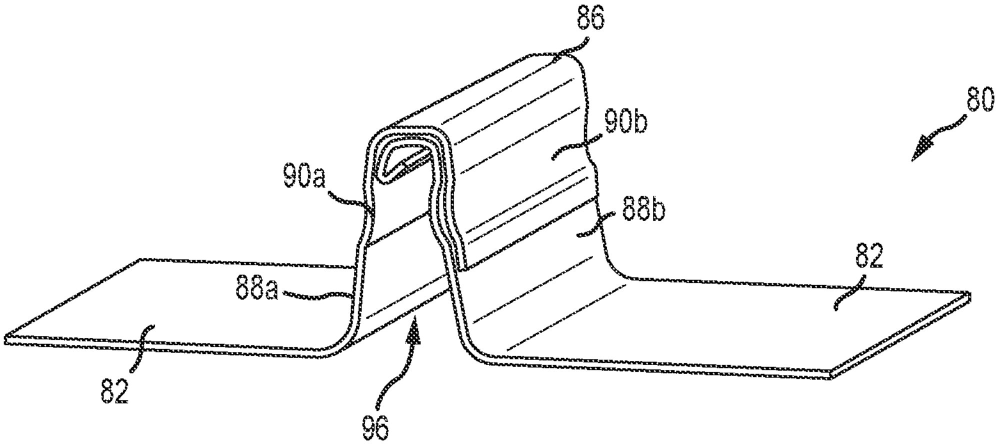
FIG.2A (Prior Art)
FIG. 2A is a perspective view of one prior art standing seam panel assembly configuration, where the standing seams are in the form of hollow seam ribs.
Figure 2B:
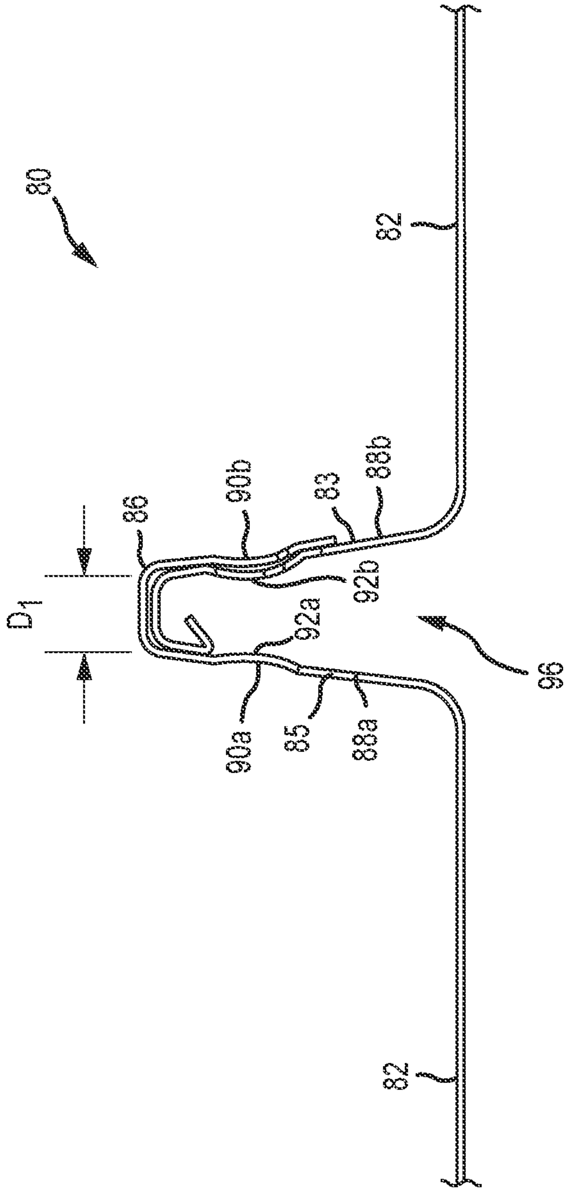
FIG.2B (Prior Art)
FIG. 2B is an end view of a standing seam of the prior art standing seam panel assembly of FIG. 2A.

As noted, an edge portion (or longitudinal edge portion) of one panel may be interconnected with an edge portion (or longitudinal edge portion) of an adjacent panel to define a standing seam. Various types of standing seam configurations exist. One type of standing seam configuration has a larger space within the standing seam and may be referred to as a hollow seam rib configuration. FIGS. 2A and 2B illustrate one type of a panel assembly 80 that may be used to define a building or roofing surface, and that uses one type of hollow seam rib configuration. The panel assembly 80 of FIGS. 2A and 2B is defined by a plurality of panels 82. Each panel 82 includes a left seam rib section 83 (a rib section used to define a hollow seam rib 86), along with a right seam rib section 85 (a rib section used to define a standing seam 86). The left seam rib section 83 and right seam rib section 85 of a given panel 82 are spaced in the width dimension of the panel 82 (or in the lateral dimension 30). Each panel 82 may include one or more flat sections, as well as one or more other structures such as crests, minor ribs, intermediate ribs, pencil ribs, striations, fluting, or flutes. Generally, the right seam rib section 85 for the left panel 82 in the view of FIG. 2B may be positioned over the left seam rib section 83 for the right panel 82 illustrated in the view of FIG. 2B to define a standing seam in the form of a hollow seam rib 86. Multiple panels 82 may be interconnected in this same general manner to define a panel assembly 80 of a desired size (both in the length dimension (longitudinal dimension 32) and width dimension (lateral dimension 30)).

Each hollow seam rib 86 of the panel assembly 80 may be characterized as having a first sidewall 88*a* and an oppositely disposed second sidewall 88*b* that are disposed in spaced relation (spaced in the lateral dimension 30). The first sidewall 88*a* includes an indentation 90*a* on an exterior of the seam rib 86, while the second sidewall 88*b* includes an indentation 90*b* on an exterior of the seam rib 86. The indentations 90*a* and 90*b* are disposed in opposing relation (e.g., disposed along a common axis that is orthogonal to the height of the hollow seam rib 86).

The seam rib 86 is of a hollow configuration, and includes an open space 96. A portion 92*a* of an internal surface of the seam rib 86 that is opposite of the indentation 90*a* (on the exterior of the seam rib 86) is spaced from a portion 92*b* of an opposing internal surface of the seam rib 86 that is opposite of the indentation 90*b* (on the exterior of the seam rib 86). In one embodiment, the portions 92*a*, 92*b* of the opposing internal surfaces of the seam rib 86 are separated by a distance Di of at least about 0.35 inches (prior to being engaged by any seam fasteners not shown) and that is measured in the lateral dimension 30. In one embodiment, the portions 92*a*, 92*b* of the opposing internal surfaces of the seam rib 86 are separated by a distance Di within a range of about 0.35 inches to about 0.75 inches. The open space 96 occupies the entire distance between the portions 92*a*, 92*b* of the opposing internal surfaces of the hollow seam rib 86. No other structure exists in this open space 96 throughout the entirety of the span between the portions 92*a*, 92*b* for the illustrated embodiment.

Exposed metal components of various types of equipment may be installed on a standing seam panel assembly of the types described herein and may become electrically energized, which in turn may electrically energize the standing seam panel assembly. In this regard, disclosed herein are various embodiments of standing seam panel assemblies that utilize an electrical bonding clip to establish an electrical path between adjacent pairs of panels that define a standing seam, and that may be used to electrically ground the standing seam panel assembly.

One embodiment of a standing seam panel assembly is illustrated in FIGS. 3A-3E and is identified by reference numeral 100. The panel assembly 100 includes a plurality of panels 82' (e.g., metal or metal alloy) that are interconnected with one another. The interconnection between each adjacent pair of panels 82' of the panel assembly 100 defines a standing seam 102 (a length dimension of the standing seam 102 (coinciding with the longitudinal dimension 32) typically being orthogonal to the lateral dimension 30 addressed below, and would also typically coincide with a pitch of a roofing surface that includes the panel assembly 100). At least one electrical bonding clip 104 may be installed on each standing seam 102 of the panel assembly 100, including on each adjacent pair of panels 82' for the standing seam panel assembly 100. Generally, each electrical bonding clip 104 of the panel assembly 100 electrically connects the corresponding pair of panels 82'. It should be appreciated any appropriate number of panels 82' may be interconnected in the manner embodied by FIGS. 3A-3E to define a standing seam panel assembly 100 of any appropriate size and/or configuration.

Figure 3A:
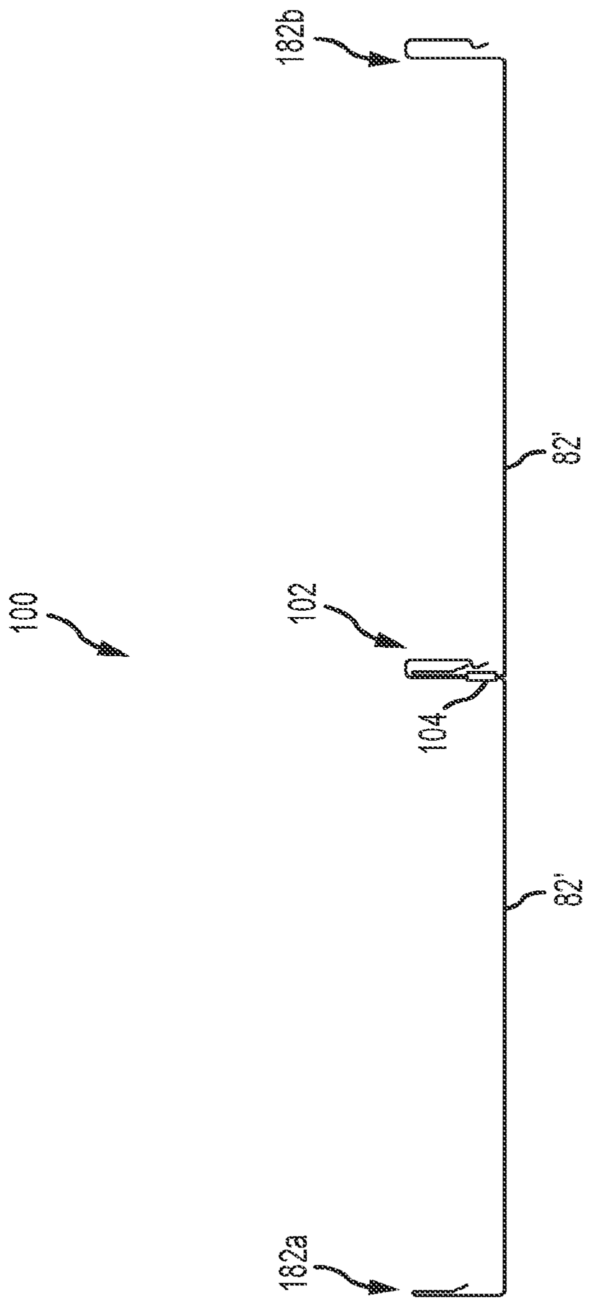
FIG. 3A is an end view of one embodiment of a standing seam panel assembly, where one embodiment of an electrical bonding clip is installed on a standing seam of the standing seam panel assembly.
Figure 3B:
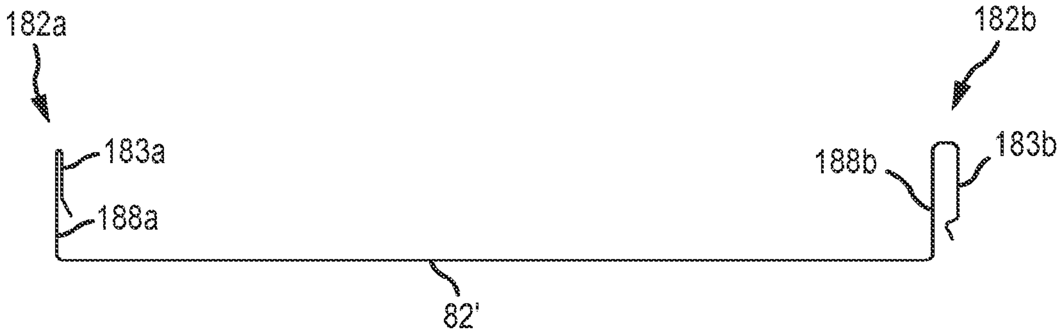
FIG. 3B is an end view of a panel used by the standing seam panel assembly of FIG. 3A.

The panels 82' of the standing seam panel assembly 100 are interconnected to define a standing steam 102 that is of a configuration that is different from the hollow seam rib configuration depicted in FIGS. 2A and 2B. Referring to FIGS. 3A and 3B, a right edge section (or a right longitudinal edge section) 182*b* of one panel 82' may be disposed over a left edge section (or a left longitudinal edge section) 182*a* of an adjacent panel 82' to define a standing seam 102. The left edge section 182*a* includes a sidewall 188*a* that extends upwardly when the corresponding panel 82' is horizontally disposed (e.g., disposed/oriented orthogonal to the pitch of the corresponding roofing surface; extending away from a reference plane that contains the main body of the corresponding panel 82'), along with an end section 183*a* that extends downwardly when the corresponding panel 82' is horizontally disposed (extending toward a reference plane that contains the main body of the corresponding panel 82'). The sidewall 188*a* and the end section 183*a* of the left edge section 182*a* are interconnected by an arcuate section, and with the end section 183*a* being disposed "inwardly" of the sidewall 188*a* in the lateral dimension 30.

The right edge section 182*b* includes a sidewall 188*b* that extends upwardly when the corresponding panel 82' is horizontally disposed (e.g., disposed orthogonal to the pitch of the corresponding roofing surface; extending away from a reference plane that contains the main body of the corresponding panel 82'), along with an end section 183*b* that extends downwardly when the corresponding panel 82' is horizontally disposed (extending toward a reference plane that contains the main body of the corresponding panel 82'). The sidewall 188*b* and the end section 183*b* of the right edge section 182*b* are interconnected by an arcuate section, and with the end section 183*b* being disposed "outwardly" of the sidewall 188*b* in the lateral dimension 30. In the illustrated embodiment, the spacing between the sidewall 188*b* and its corresponding end section 183*b* is larger than the spacing between the sidewall 188*a* and its corresponding end section 183*a*.

Each panel 82' further includes a first lateral edge or end 132 and a second lateral edge or end 136 that are spaced from one another, and each of which coincides with the lateral dimension 30. Typically the lateral dimension 30 will be that which coincides with a constant elevation when proceeding along a line in the lateral dimension 30 and when the panel assembly 100 is in an installed configuration to define a pitched roofing surface. In any case and as noted, a right edge section 182*b* of one panel 82' is disposed over a left edge section 182*a* of an adjacent panel 82' to define a standing seam 102 in the case of the panel assembly 100. At this time, the sidewall 188*b* of the right edge section 182*b* of one panel 82' may be disposed in closely spaced relation (and/or actually in interfacing relation) with the sidewall 188*a* of the left edge section 182*a* of the adjacent panel 82'. An electrical bonding clip 104 may be installed on the standing seam 102 of the panel assembly 100, namely on corresponding portions of the sidewall 188*b* of one panel 82' and the corresponding sidewall 188*a* of the adjacent panel 82' that collectively define a standing seam 102. In the case of the standing seam panel assembly 100, the electrical bonding clip 104 may be characterized as being installed in a vertical orientation.

Figure 3C:
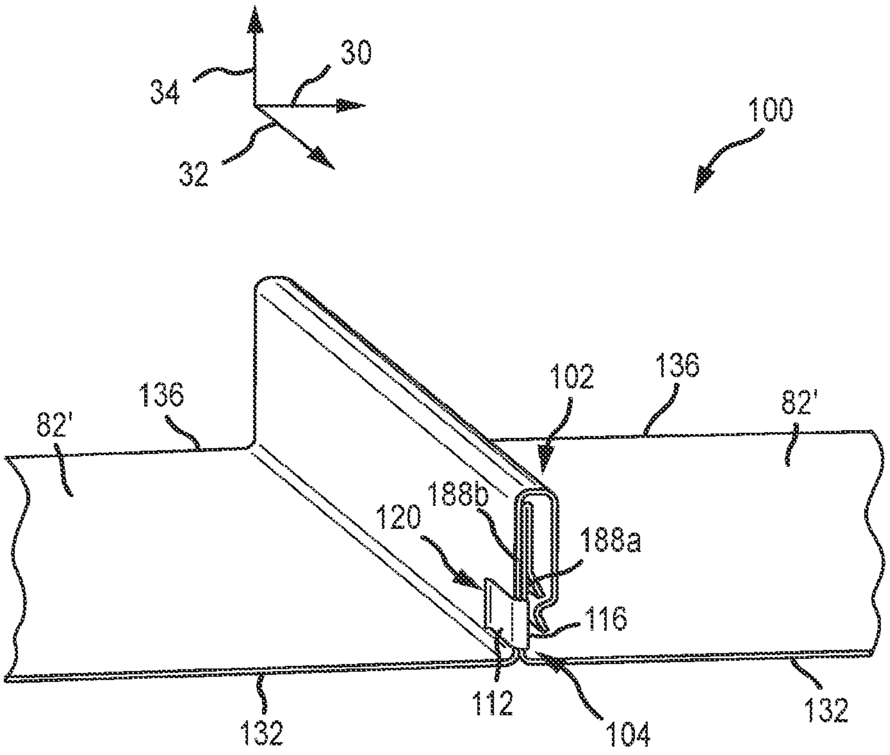
FIG. 3C is an enlarged perspective view of an electrical bonding clip that is installed on a standing seam of the standing seam panel assembly of FIG. 3A.
Figure 3D:
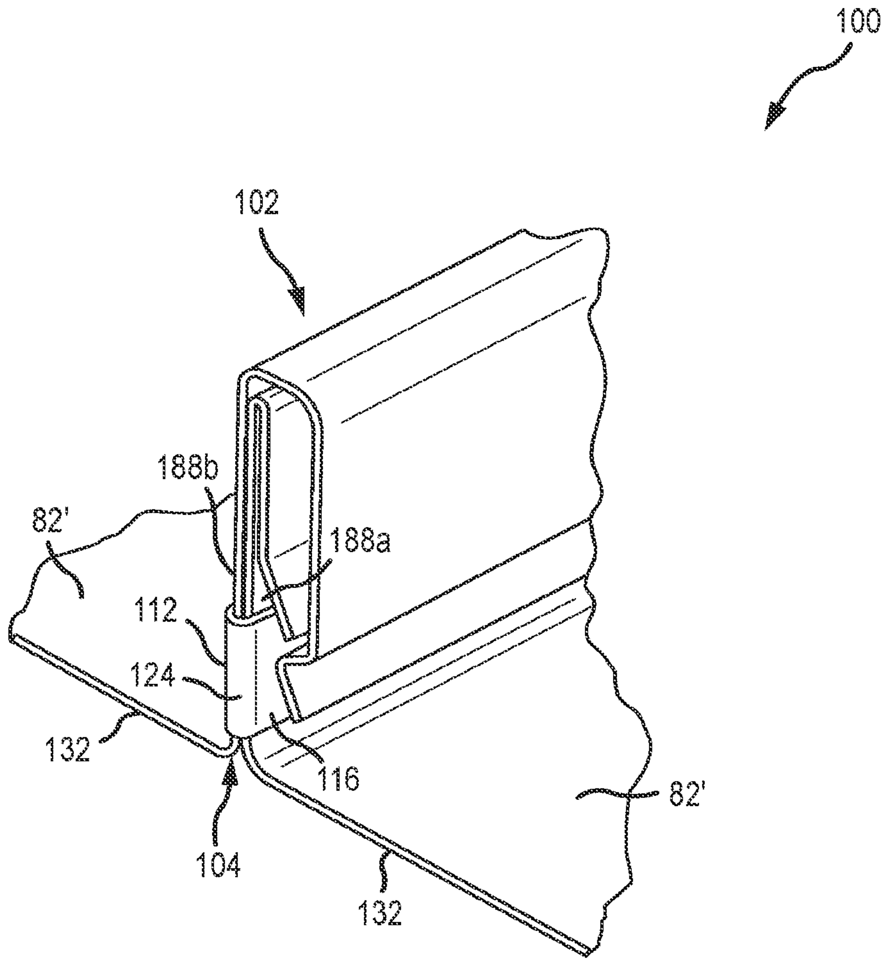
FIG. 3D is another enlarged perspective view of the electrical bonding clip and standing seam shown in FIG. 3C, viewed from an opposite side compared to FIG. 3C.
Figure 3E:
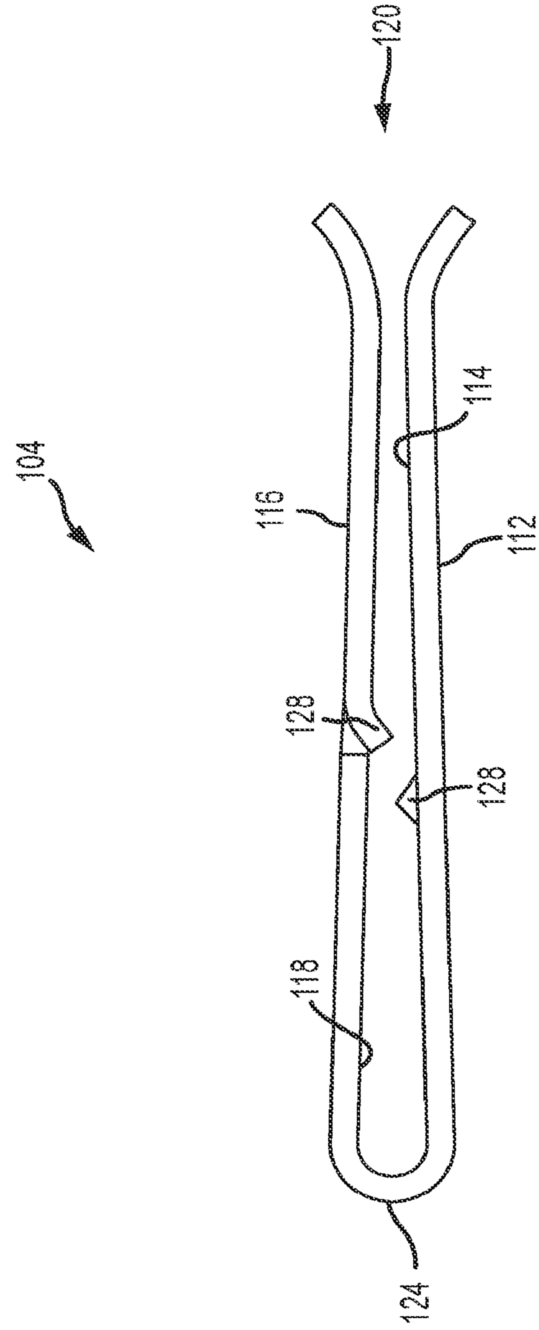
FIG. 3E is an enlarged side view of the electrical bonding clip used by the standing seam panel assembly of FIG. 3A.

Details of each electrical bonding clip 104 used by the standing seam panel assembly 100 are presented in FIGS. 3C-3E, and where each such electrical bonding 104 will typically be of the same configuration. As such, only one of the electrical bonding clips 104 will now be described. The electrical bonding clip 104 may be characterized as including a first clip member 112 and a second clip member 116 that is disposed in opposing relation to its corresponding first clip member 112. The first clip member 112 includes a first surface 114 that faces or projects toward the second clip member 116 (i.e., an interior surface of the electrical bonding clip 104) and that includes at least one electrical contact or grounding projection 128. The second clip member 116 includes a second surface 118 that faces or projects toward the first clip member 112 (i.e., an oppositely disposed interior surface 114 of the electrical bonding clip 104) and that includes at least one grounding projection 128. One end of the electrical bonding clip 104 is "open" and may be characterized as an inlet section 120 to the clip 104. The ends of the first clip member 112 and the second clip member 116 at the inlet section 120 may each flare in a direction away from one another to facilitate installation on a standing seam 102 as desired/required. An opposite end of the electrical bonding clip 104 is "closed" and may be characterized as a closed end or end section 124. In the case of the standing seam panel assembly 100 and as shown in FIGS. 3A, 3C, and 3D, the closed end 124 is vertically disposed/oriented when the clip 104 is installed on the corresponding standing seam 102 (e.g., disposed or oriented in the vertical dimension 34). At this time, one of the clip members 112, 116 will engage at least part of the sidewall 188*a* (one of the panels 82') for the corresponding standing seam 102, while the other of the clip members 112, 116 will engage at least part of the sidewall 188*b* (an adjacent panel 82') for the corresponding standing seam 102.

The first clip member 112 and the second clip member 116 of the electrical bonding clip 104 may be biased at least generally toward one another (e.g., via the elasticity of the end section 124 of the clip 104), including to the extent where the first clip member 112 and second clip member 116 are in contact with one another prior to being installed on a standing seam 102 of the panel assembly 100 (although such is not required). In any case, the spacing between the first clip member 112 and the second clip member 116 increases as/when the electrical bonding clip 104 is being installed on a standing seam 102. This "expansion" of the electrical bonding clip 104 may be realized by a flexing or bending (e.g., an elastic deformation) of the electrical bonding clip 104, may be characterized as a relative deflection of the first clip member 112 and the second clip member 116 at least generally away from one another, or both. For instance, the end section 124 of the electrical bonding clip 104 may be characterized as a "living hinge" (e.g., an arcuately-shaped, elastically-deformable, pliable portion) that allows relative movement between and interconnects the first clip member 112 and the second clip member 116. As such, the first clip member 112 and the second clip member 116 of the electrical bonding clip 104 may be characterized as being relatively deflectable away from one another (e.g., the second clip member 116 of the electrical bonding clip 104 may at least generally move away from the first clip member 112 by an elastic deformation of an interconnecting portion of the electrical bonding clip 104, for instance the noted living hinge in the form of the end section 124; pivotal or pivotal-like motion at least generally about the end section 124).

The first clip member 112 and the second clip member 116 of the electrical bonding clip 104 may at least at some point in time be biased toward one another as noted, and again this biasing force may be provided by the end section 124 (e.g., an elastic configuration). During at least a portion of the relative movement of the first clip member 112 and the second clip member 116 away from one another, the amount of biasing force may progressively increase (e.g., by an elastic "flexing" of the corresponding end section 124). Although a biasing force could be exerted on one or more of the first clip member 112 and the second clip member 116 prior to being installed on a standing seam 102 (including when the clip members 112, 116 are in contact with one another), such may not be required.

Referring now to FIG. 3E, the electrical bonding clip 104 may incorporate at least one electrical contact or grounding projection 128 on the first surface 114 of the first clip member 112, and at least one grounding projection 128 on the second surface 118 of the second clip member 116. These grounding projections 128 may be used to establish electrical connectivity between the two panels 82' that are engaged by the electrical bonding clip 104 via being installed on the corresponding standing seam 102. At least one grounding projection 128 of the first clip member 112 will engage (and be in electrical contact with) one of the panels 82' that define the standing seam 102 on which the clip 104 is mounted (either its sidewall 188*a* or its sidewall 188*b*), while at least one grounding projection 128 of the second clip member 116 will engage (and be in electrical contact with) the other of the panels 82' that define the standing seam 102 on which the clip 104 is mounted (either its sidewall 188*a* or its sidewall 188*b*). Each of the grounding projections 128 that are used by the electrical bonding clip 104 may be of a size, shape, and/or configuration, but are preferably configured so as to scratch the corresponding surface of the standing seam 102 as the clip 104 is being installed on the standing seam 102. This should enhance/allow electrical communication between the first clip member 112 and the panel 82' that is engaged thereby (at the standing seam 102—either its sidewall 188*a* or sidewall 188*b*), and which should enhance/allow electrical communication between the second clip member 116 and the panel 82' that is engaged thereby (at the standing seam 102—either its sidewall 188*a* or sidewall 188*b*). The clip members 112, 116 may be characterized as engaging opposed surfaces of overlapping portions of the two panels 82' that define at least part of the standing seam 102.

The noted grounding projections 128 for the first surface 114 and second surface 118 of the electrical bonding clip 104 may be characterized as providing electrical continuity between standing seam panels that are engaged by the electrical bonding clip 104 (e.g., an electrical path may encompass a first panel 82' engaged with one or more grounding projections 128 on the first surface 114 of the electrical bonding clip 104, the first surface 114 of the electrical bonding clip 104 being electrically connected to the second surface 118 of the electrical bonding clip 104 through the end section 124, and one or more grounding projections 128 of the second surface 118 of the electrical bonding clip 104 being engaged with a second panel 82'). This may be referred to as "bonding" or "electrically bonding" a pair of adjacent panels 82'. In any case, the noted electrical connection provided by the grounding projections 128 of the electrical bonding clip 104 may be used to electrically connect standing seam panels, which in turn may be used to provide an electrical path to ground an entire building surface of standing seam panels (or any portion thereof).

The electrical bonding clip 104 may be formed of any appropriate material or combination of materials to establish an electrical connection between a pair of panels 82' that together define a standing seam 102 (e.g., a metal or a metal alloy, and including from an electrically conductive material). For example, the electrical bonding clip 104 may be formed entirely of stainless steel. Furthermore, the electrical bonding clip 104 may be fabricated in any appropriate manner. For instance, the electrical bonding clip 104 could be of a one-piece construction (e.g., being integrally formed from a piece of sheet metal).

In summary, an electrical bonding clip 104 of the panel assembly 100 may electrically engage overlapping portions of a first panel 82' and a second panel 82', namely at a standing seam 102 defined by the interconnection of these two panels 82'. In this regard, the electrical bonding clip 104 may be appropriate for installation on other standing seam configurations that are defined at least in part by overlapping portions from two adjacent panels, such as a double fold or double-folded standing seam configurations. The electrical bonding clip 104 provides what may be characterized as a "slide fit" for the pair of panels 82' on which the clip 104 is installed. In this regard, the inlet section 120 of the electrical bonding clip 104 will be aligned with the adjacently disposed sidewalls 188*a*, 188*b* for the two panels 82' at the lateral edges 132 of the two panels 82' (another clip 104 could be installed on the same standing seam 102 at the oppositely disposed lateral edges 136 of the panels 82' as desired/required). The electrical bonding clip 104 will then be advanced toward the standing seam 102 (e.g., at least generally in the direction of the opposing lateral edges 136 of the panels 82') to position the first clip member 112 on one side of the standing seam 102 and to position the second clip member 116 on the other side of the standing seam 102. The electrical bonding clip 104 may be slid onto the standing seam 102 in the noted manner until the end section 124 of the electrical bonding clip 104 engages the lateral edges 132 of the two panels 82' at the standing seam 102, although such may not be required in all instances.

In the embodiment shown in FIGS. 3C and 3D, the first clip member 112 of the electrical bonding clip 104 engages the sidewall 188*b* for the left panel 82', while the second clip member 116 of the clip 104 engages the sidewall 188*a* for the right panel 82' and in the views for FIGS. 3C and 3D, all as the clip 104 is slid onto a standing seam 102 in the noted manner. This installation may also increase the spacing between the first clip member 112 and the second clip member 116 as noted above, and which should generate a sufficient force so as to retain the electrical bonding clip 104 on the standing seam 102. Again, the first surface 114 of the first clip member 112 and the second surface 118 of the second clip member 116 each may include one or more grounding projections 128 (e.g., having one or more "sharp" edges). Such grounding projections 128 may facilitate establishing sufficient electrical contact with the corresponding panel 82' (e.g., by configuring such grounding projections 128 to break a coating on the panel assembly 100 as the electrical bonding clip 104 is installed on a standing seam 102 in the foregoing manner). That is, the sliding motion that is used to install the electrical bonding clip 104 on the standing seam 102 may slide one or more grounding projections 128 along each side of the standing seam 102 (and while remaining in contact therewith) to enhance the electrical path between the clip 104 and each of the panels 82' that are engaged by the clip 104.

When an electrical bonding clip 104 has been installed on a standing seam 102 in the noted manner, the two panels 82' may be characterized as being "bonded" or "electrically bonded" via the electrical bonding clip 104. A series of panels 82' that collectively define the panel assembly 100 may therefore be electrically connected by each associated electrical bonding clip 104, namely by installing at least one electrical bonding clip 104 on each adjacent pair of panels 82' that collectively define a corresponding standing seam 102. This electrical path may be used to ground the entire panel assembly 100 (e.g., by running a grounding wire from one or more of the panels 82' of the panel assembly 100 to ground, as each adjacent pair of standing seam panels 82' in the panel assembly 100 should be electrically interconnected by at least one electrical bonding clip 104). The noted electrical path includes the left metal panel 82' shown in FIGS. 3C and 3D, to the first clip member 112 (via the engagement of or more grounding projections 128 of the first clip member 112 that engages this left metal panel 82'), from the first clip member 112 to the second clip member 116 via the closed end section 124, and from the second clip member 116 to the right metal panel 82' shown in FIGS. 3C and 3D (including via one or more grounding projections 128 of the second clip member 116 that engages this right metal panel 82').

Figure 4:
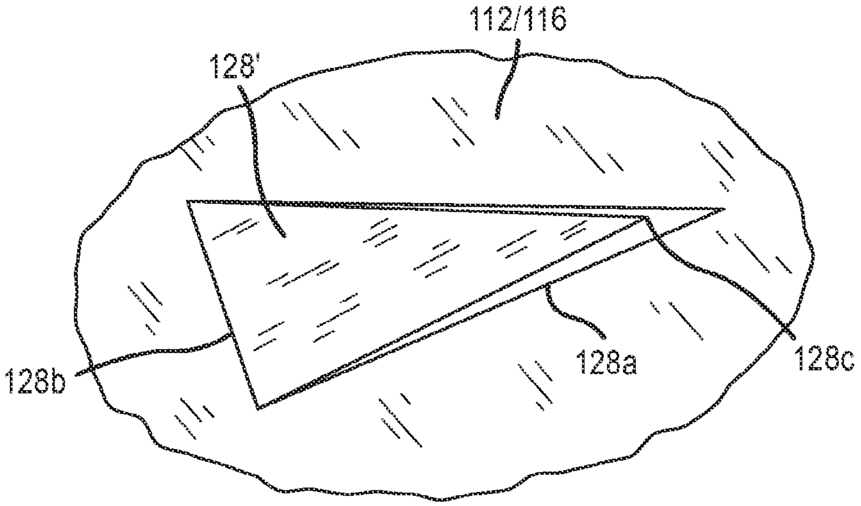
FIG. 4 is an enlarged perspective view of a grounding projection/electrical contact that may be used by an electrical bonding clip that is installed on a standing seam panel assembly.

FIG. 4 presents a representative configuration for the electrical contacts or grounding projections 128 used by the electrical bonding clip 104 of FIGS. 3A-3E. Other configurations may be appropriate. The electrical contact 128' shown in FIG. 4 cantilevers from a remainder of the corresponding clip member 112/116 of the electrical bonding clip 104 (e.g., each electrical contact 128' may be "punched" from the corresponding clip member 112/116). That is, the electrical contact 128' is partially separated from its corresponding clip member 112/116 to define an aperture 128*a*. The boundary between the electrical contact 128' and the remainder of the clip member 112/116 (where the electrical contact 128' remains attached to its corresponding clip member 112/116) is identified by reference numeral 128*b* in FIG. 4. The electrical contact 128' may flex or bend relative to the corresponding clip member 112/116 at least generally about this boundary 128*b*, and as such this may also be referred to as "hinge 128*b*."

In the illustrated embodiment, the electrical contact 128' is at least generally triangularly-shaped, and in any case extends toward the opposing clip member 112, 116 at an angle. Other configurations may be appropriate. A free end section or point 128*c* of the electrical contact 128' may be characterized as being disposed in the direction of the closed end section 124 of the electrical bonding clip 104, while the hinge 128*b* may be characterized as being disposed in the direction of the inlet 120. That is, the electrical contact 128' may be characterized as extending from its hinge 128*b* at least generally in the direction of the closed end section 124. As noted, the electrical contact 128' may also be characterized as extending from its hinge 128 associated with one of the clip members 112, 116, at least generally in the direction of the other of the clip members 112, 116.

Another embodiment of a standing seam panel assembly is illustrated in FIGS. 5A-5E and is identified by reference numeral 200. The panel assembly 200 includes a plurality of panels 82" (e.g., metal or metal alloy) that are interconnected with one another. Each panel 82" includes a first lateral edge or end 232 and a second lateral edge or end 236 that are spaced from one another in the longitudinal dimension 32. The interconnection between each adjacent pair of panels 82" of the panel assembly 200 defines a standing seam 202 (a length dimension of the standing seam 202 typically being orthogonal to the lateral dimension 30, and would typically coincide with a pitch of a roofing surface that includes the panel assembly 200). At least one electrical bonding clip 204 may be installed for each standing seam 202 used by the panel assembly 200, including for each adjacent pair of panels 82" of the standing seam panel assembly 200 that are interconnected to define a standing seam 202. Generally, each electrical bonding clip 204 of the panel assembly 200 electrically connects each pair of panels 82" that are interconnected to define a standing seam 202. It should be appreciated any appropriate number of panels 82" may be interconnected in the manner embodied by FIGS. 5A-5E to define a standing seam panel assembly 200 of any appropriate size and/or configuration.

The electrical bonding clips 104 used by the standing seam panel assembly 100 of FIGS. 3A-3E are each installed directly on a standing seam 102 in accordance with the foregoing. That is not the case for the electrical bonding clips 204 used by the standing seam panel assembly 200 of FIGS. 5A-5E. Generally, each electrical bonding clip 204 for the embodiment of FIGS. 5A-5E separately engages each panel 82" that defines a standing seam 202 on each of the two sides of the standing seam 202, not on the standing seam 202 itself. As such and as will be addressed in more detail below, one portion of a given electrical bonding clip 204 will be positioned on one side of the corresponding standing seam 202 (and engages only one of the two panels 82" that defines this standing seam 202), while another portion of this same electrical bonding clip 204 will be positioned on the opposite side of this same standing seam 202 (and engages only the other of the two panels 82" that defines this same standing seam 202).

Figure 5A:
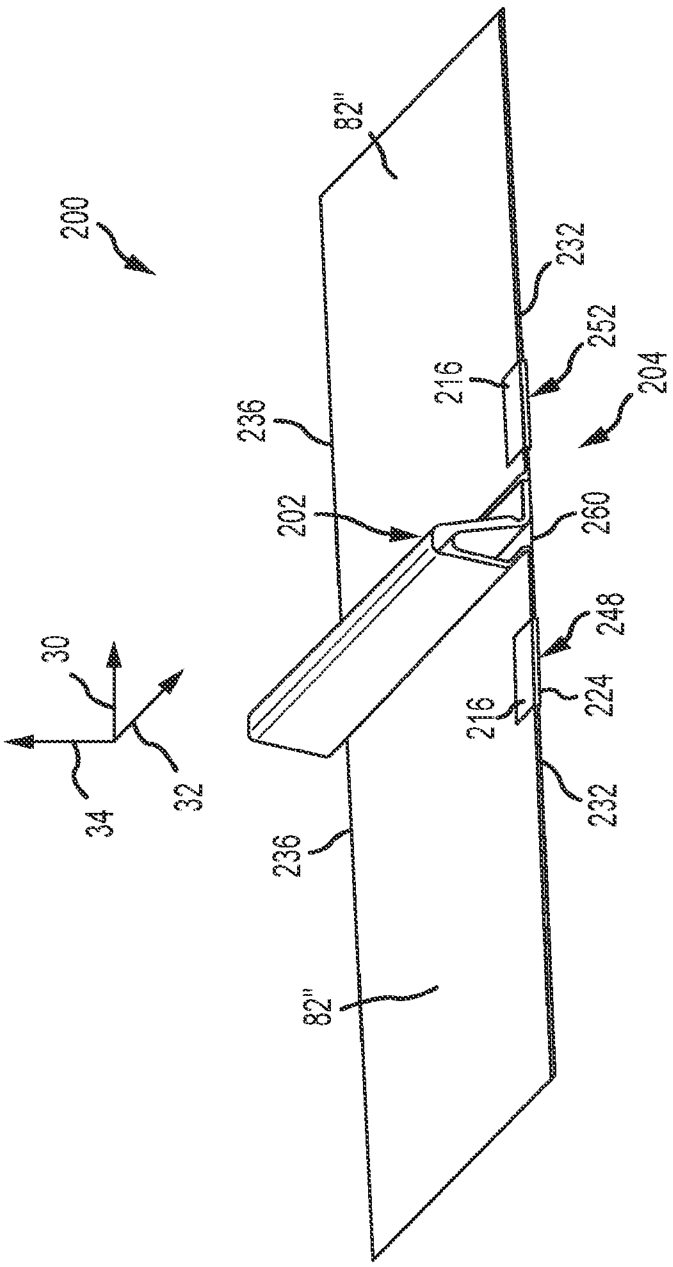
FIG. 5A is a perspective top view of another embodiment of a standing seam panel assembly, where another embodiment of an electrical bonding clip engages an adjacent pair of panels on opposite sides of a corresponding standing seam.
Figure 5B:
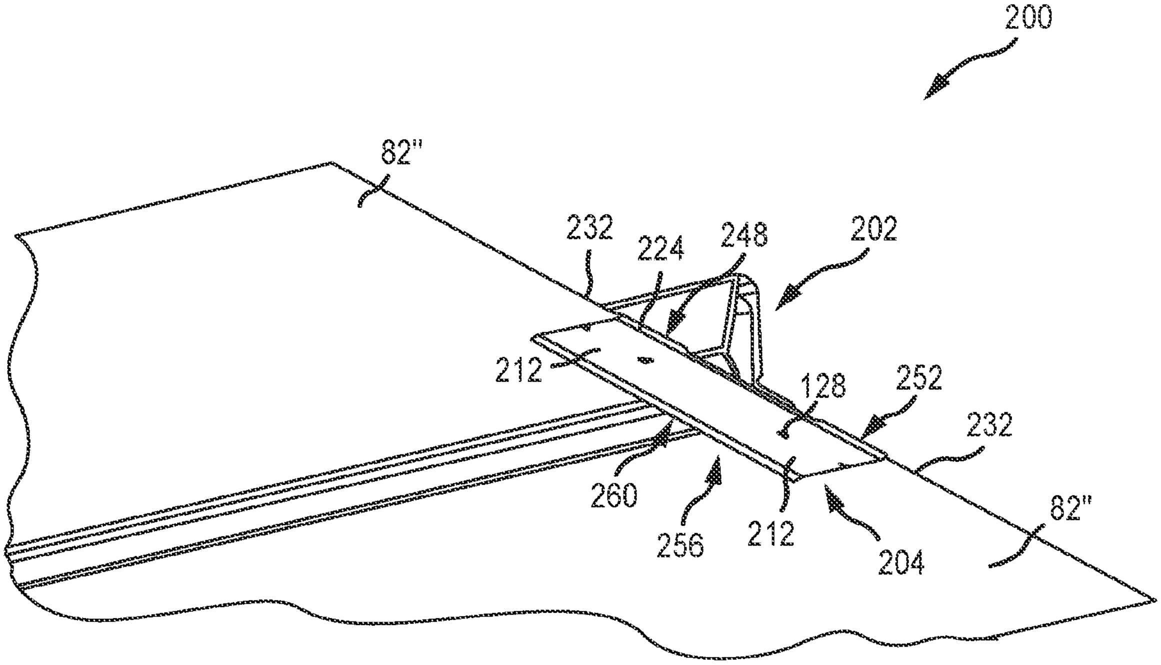
FIG. 5B is a perspective bottom view of a portion of the standing seam panel assembly of FIG. 5A that incorporates an electrical bonding clip.

Referring now primarily to FIGS. 5A and 5B, a pair of panels 82" of the standing seam panel assembly 200 are shown as being interconnected to define a standing seam 202. The standing seam 202 in this case is in the form of a hollow seam rib. A different hollow seam rib configuration is shown in FIGS. 2A and 2B and was addressed above. The electrical bonding clip 204 can be used with any hollow seam rib configuration (including that which is presented in FIGS. 2A and 2B), and in fact could be used with the standing seam configuration used by the standing seam panel assembly 100 of FIGS. 3A-3E (or any other standing seam configuration for that matter). Generally, the electrical bonding clip 204 does not engage a standing seam, but instead separately engages the two panels that are on each side of this standing seam (where the two noted panels are interconnected to define this standing seam). In addition, the electrical bonding clip 204 is installed in a horizontal orientation (versus the vertical orientation used by the electrical bonding clip 104 for the panel assembly 100 of FIGS. 3A-3E).

The electrical bonding clip 204 of the panel assembly 200 includes a first clip section 248 and a second clip section 252 that are spaced from one another in the lateral dimension 30. The first clip section 248 is positioned on one side of the standing seam 202 and engages only one of the two panels 82" that defines this standing seam 202. In the view shown in FIGS. 5A and 5B, the first clip section 248 is positioned on the left side of the standing seam 202 and engages only the left panel 82". The second clip section 252 is positioned on the other side of the standing seam 202 and engages only one of the two panels 82" that defines this standing seam 202. In the view shown in FIGS. 5A and 5B, the second clip section 252 is positioned on the right side of the standing seam 202 and engages only the right panel 82". Any appropriate spacing may exist between the standing seam 202 and each of the clip sections 248, 252.

Figure 5C:
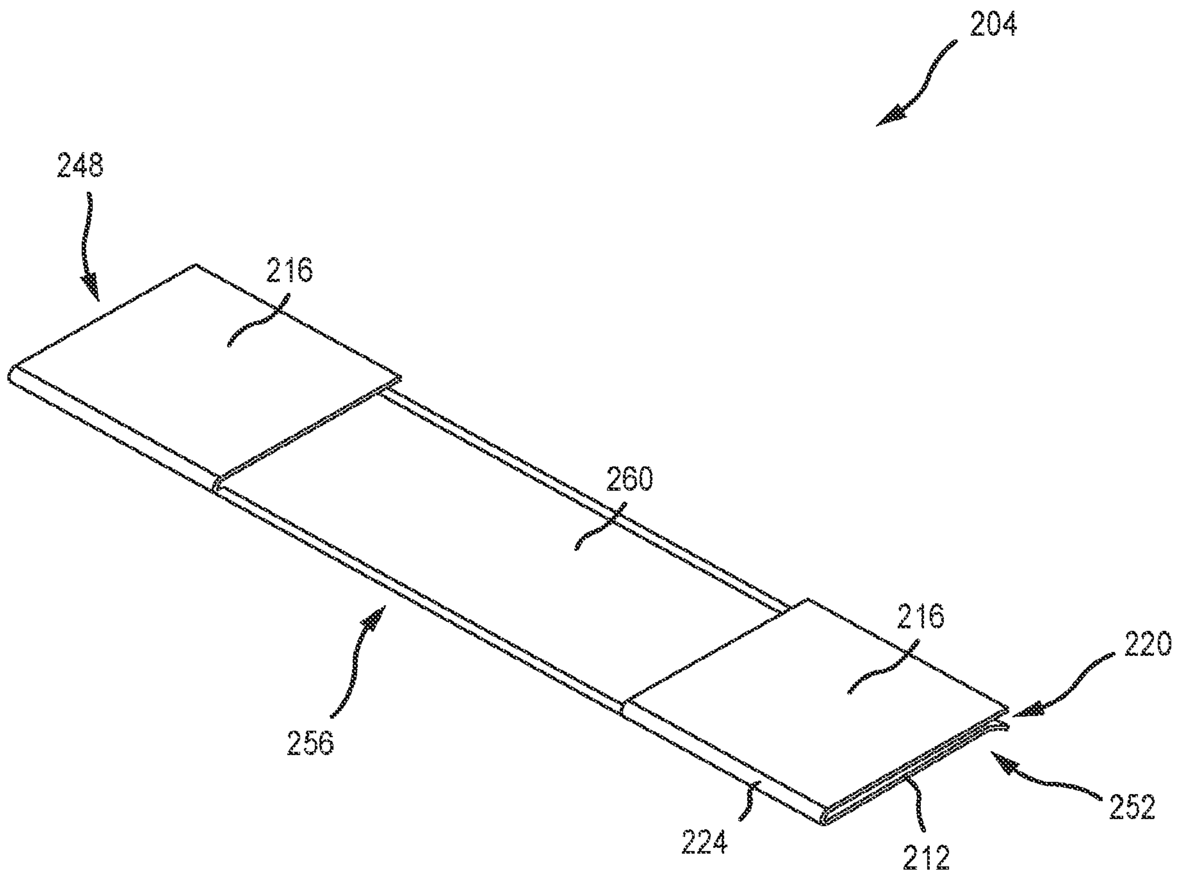
FIG. 5C is an enlarged perspective top view of an electrical bonding clip used by the standing seam panel assembly of FIG. 5A.
Figure 5D:
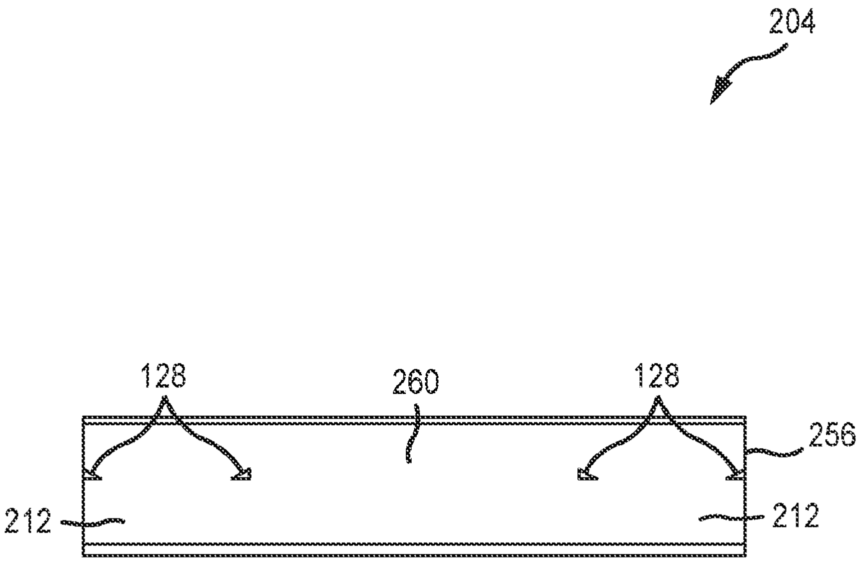
FIG. 5D is an enlarged bottom view of the electrical bonding clip shown in FIG. 5C.
Figure 5E:
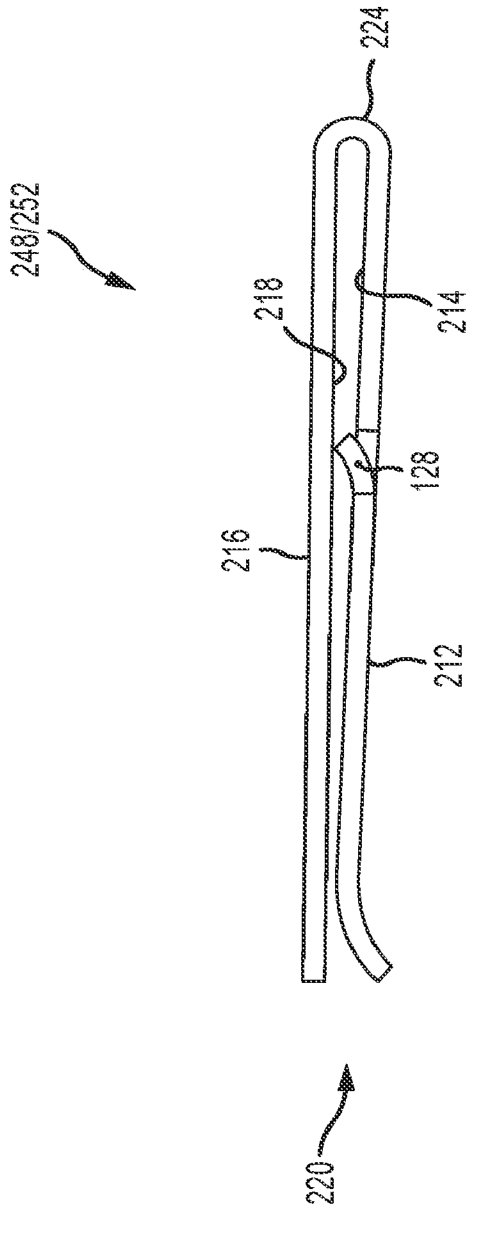
FIG. 5E is an enlarged side view of the electrical bonding clip shown in FIG. 5C.

Additional details of the electrical bonding clip are shown in FIGS. 5C-5E. Each of the first clip section 248 and the second clip section 252 includes a first clip member 212 and a second clip member 216 that are disposed in opposing relation to one another in the same manner as discussed above regarding the electrical bonding clip 104 of FIGS. 3A-3E. The discussion presented above regarding the electrical bonding clip 104 is thereby equally applicable to each of the first clip section 248 and the second clip section 252 of the electrical bonding clip 204 unless otherwise noted herein to the contrary. The electrical bonding clip 204 includes a plate or base 256 that is disposed on an underside of a pair of adjacently disposed panels 82" that are interconnected to define a standing seam 202 when the clip 204 is in an installed configuration. Generally, one part of the plate 256 defines one part of the first clip section 248 (its corresponding first clip member 212—discussed below), another part of this same plate 256 defines part of the second clip section 252 (its corresponding first clip member 212—discussed below), and yet another part of this same plate 256 is disposed under the standing seam 202 (an intermediate portion 260 that extends between the first clip member 212 for each of the first clip section 248 and the second clip section 252). The bottom plate 256 may be of any appropriate extent in the lateral dimension 30, and including where the bottom plate 256 extends beyond the first clip section 248 in the lateral dimension 30 and in a direction that is further away from the corresponding stand seam 202 (not shown) and/or including where the bottom plate 256 extends beyond the second clip section 252 in the lateral dimension 30 and in a direction that is further away from the corresponding stand seam 202 (not shown).

The first clip member 212 for each of the first clip section 248 and second clip section 252 includes a first surface 214 that faces or projects toward the corresponding second clip member 216 (i.e., an interior surface for the corresponding clip section 248, 252) and that includes at least one of the above-noted grounding projections 128. The second clip member 216 for each of the first clip section 248 and the second clip section 252 includes a second surface 218 that faces or projects toward the corresponding first clip member 212. In the illustrated embodiment, the second surface 218 of the second clip member 216 for each clip section 248, 252 lacks any type of grounding projection (e.g., in the form of a smooth surface). The first clip member 212 for each of the first clip section 248 and the second clip section 252 is disposed on and engages an underside (or interior side) of the corresponding panel 82", while the second clip member 216 for each of the first clip section 248 and the second clip section 252 is disposed on and engages a topside (or exterior side) of the corresponding panel 82". As the second clip member 216 for each of the first clip section 248 and the second clip section 252 does not include any ground projections in the illustrated embodiment, installation of the electrical bonding clip 204 should not scratch the top or upper surface of the corresponding panels 82" to any significant degree.

As illustrated in FIG. 5E, a common end for each of the first clip section 248 and second clip section 252 is "open" and may be characterized as an inlet section 220 to the corresponding clip section 248, 252. An opposite common end for each of the first clip section 248 and second clip section 252 is "closed" and may be characterized as an end section 224. A free end portion of the first clip member 212, at the inlet section 220 for each of the clip sections 248, 252 may flare or diverge away from the corresponding second clip member 216 to facilitate installation of the electrical bonding clip 204 on the panels 82" as desired/required. The entirety of each second clip member 216 may be an at least substantially planar structure such that when the electrical bonding clip 204 is engaged with a pair of panels 82", each second clip member 216 should be at least substantially flush (i.e., in contact) with a topside of the corresponding panel 82" (e.g., an exterior side of the panel 82").

In the case of the standing seam panel assembly 200 and as shown in FIGS. 5A and 5B, the end section 224 for each of the clip sections 248, 252 is horizontally disposed when installed on an adjacent pair of panels 82" that are interconnected to define a standing seam 202. As such, the second clip member 216 for each clip section 248, 252 will engage an upper surface of the corresponding panel 82" on each side of the corresponding standing seam 202, while the first clip member 212 for each of the clip sections 248, 252 will engage a lower/bottom surface (or the underside) of the corresponding panel 82" on each side of the corresponding standing seam 202.

The clip sections 248, 252 for the electrical bonding clip 204 will typically be of a common configuration. The following discussion is equally applicable to both clip sections 248, 252 unless otherwise noted. The first clip member 212 and the corresponding second clip member 216 may be biased at least generally toward one another (e.g., via the elasticity of the corresponding closed end 224), including to the extent where the first clip member 212 and the corresponding second clip member 216 are in contact with one another prior to being installed on an adjacent pair of panels 82" of the panel assembly 200 (although such is not required). In any case, the spacing between the first clip member 212 and the corresponding second clip member 216 increases as/when the electrical bonding clip 204 is installed on an adjacent pair of panels 82" of the panel assembly 200. This "expansion" of the clip sections 248, 252 may be realized by a flexing or bending (e.g., an elastic deformation) of the clip sections 248, 252, may be characterized as a relative deflection of the first clip member 212 and the corresponding second clip member 216 at least generally away from one another, or both. For instance, the end section 224 for each of the clip sections 248, 252 may be characterized as a "living hinge" (e.g., an arcuately-shaped, elastically-deformable, pliable portion) that allows relative movement between and interconnects a first clip member 212 and a corresponding second clip member 216. As such, the first clip member 212 and the corresponding second clip member 216 may be characterized as being relatively deflectable away from one another (e.g., the second clip member 216 may at least generally move away (relatively) from the corresponding first clip member 212 by an elastic deformation of an interconnecting portion of the corresponding clip section 248, 252, for instance the noted living hinge in the form of the corresponding end section 224; pivotal or pivotal-like motion at least generally about the end section 224).

The first clip member 212 and the corresponding second clip member 216 may at least at some point in time be biased toward one another as noted, and again this biasing force may be provided by the corresponding end section 224 disposed therebetween (e.g., an elastic configuration). During at least a portion of the relative movement of the first clip member 212 and the corresponding second clip member 216 away from one another, the amount of the biasing force may progressively increase (e.g., by an elastic "flexing" of the corresponding end section 224). Although a biasing force could be exerted on one or more of the first clip member 212 and the corresponding second clip member 216 prior to being installed on an adjacent pair of panels 82" of the panel assembly 200 (including when the corresponding clip members 212, 216 are in contact with one another), such is not required.

Referring now to FIG. 5E, the electrical bonding clip 204 may incorporate at least one electrical contact or grounding projection 128 on the first surface 214 of each first clip member 212. These grounding projections 128 may be used to establish electrical connectivity between the two panels 82" that are engaged by the electrical bonding clip 204 via engaging a panel 82" on each side of a standing seam 202 defined by a pair of adjacent panels 82". At least one grounding projection 128 of the first clip member 212 for the first clip section 248 will engage (and be in electrical contact with) one of the panels 82" associated with a particular standing seam 202, while at least one grounding projection 128 of the first clip member 212 for the second clip section 252 will engage (and be in electrical contact with) the other of the panels 82" associated with this same standing seam 202. This should accommodate/allow electrical communication between the first clip member 212 of the first clip section 248 and the panel 82" that is engaged thereby, and which should allow electrical communication between the first clip member 212 of the second clip section 252 and the panel 82" that is engaged thereby. The clip sections 248, 252 are electrically connected by the common bottom plate 256 of the clip 204.

The noted grounding projections 128 for the first surface 214 of the first clip member 212 for each of the clip sections 248, 252 of the electrical bonding clip 204 may be characterized as providing electrical continuity between a pair of standing seam panels that are engaged by the electrical bonding clip 204 (e.g., an electrical path may encompass one panel 82" being engaged by one or more grounding projections 128 of the first clip member 212 for the first clip section 248 of the electrical bonding clip 204, by the first clip member 212 for the first clip section 248 of the electrical bonding clip 204 being electrically connected with the first clip member 212 for the second clip section 252 of the electrical bonding clip 204 by the intermediate portion 260 of the bottom plate 256, and the adjacent panel 82" being engaged by one or more grounding projections 128 of the first clip member 212 for the second clip section 252 of the electrical bonding clip 204). Again, this may be referred to as "bonding" or "electrically bonding" an adjacent pair of panels 82". In any case, the noted electrical connection provided by the grounding projections 128 of the electrical bonding clip 204 may be used to electrically connect adjacent pairs of standing seam panels, which in turn may be used to provide an electrical path to ground an entire building surface of standing seam panels (or any discrete portion thereof).

The electrical bonding clip 204 may be formed of any appropriate material or combination of materials to establish an electrical connection between a pair of panels 82" that together define a standing seam 202 (e.g., a metal or a metal alloy, and including from an electrically conductive material). For example, the electrical bonding clip 204 may be formed entirely of stainless steel. Furthermore, the electrical bonding clip 204 may be fabricated in any appropriate manner. For instance, the electrical bonding clip 204 could be of a one-piece construction (e.g., being integrally formed from a piece of sheet metal).

In summary, an electrical bonding clip 204 electrically engages an adjacent pair of panels 82" other than at the standing seam 202 defined by this adjacent pair of panels 82" for the case of the panel assembly 200 of FIGS. 5A-5E. The electrical bonding clip 204 provides what may be characterized as a "slide fit" for an adjacent pair of panels 82" on which the clip 204 is to be installed. In this regard, the inlet section 220 of the clip section 248 will be aligned with a lateral edge 232 of the left panel 82" shown in FIG. 5A at a location other than at the standing seam 202, while the inlet section 220 of the clip section 252 will be aligned with a lateral edge 232 of the right panel 82" shown in FIG. 5A at a location other than at the standing seam 202 (another clip 204 could be installed in the same general manner, but on the oppositely disposed lateral edge 236 of the panels 82", as desired/required). The electrical bonding clip 204 will then be advanced to position a portion of the left panel 82" shown in FIG. 5A between the first clip member 212 and the second clip member 216 of the first clip section 248, and to position a portion of the right panel 82" shown in FIG. 5A between the first clip member 212 and the second clip member 216 of the second clip section 252 (e.g., a movement at least generally in the direction of the opposing lateral edge 236 of the corresponding panel 82"). The electrical bonding clip 204 may be slid onto the two panels 82" shown in FIG. 5A in the noted manner until the end section 224 of the first clip section 248 engages the lateral edge 232 of the left panel 82" shown in FIG. 5A and/or until the end section 224 of the second clip section 252 engages the lateral edge 232 of the right panel 82" shown in FIG. 5A, although such may not be required in all instances. As such, the first clip section 248 for the clip 204 will be positioned on the left side of the standing seam 202 shown in FIG. 5A, while the second clip section 252 for the clip 204 will be positioned on the right side of the standing seam 202 shown in FIG. 5A. Although the electrical grounding clip 204 may be installed such that the clip sections 248, 252 will be equally spaced from the standing seam 202, such need not be the case for all circumstances.

When an electrical bonding clip 204 has been installed on an adjacent pair of panels 82" in the above-noted manner, the two panels 82" may be characterized as being "bonded" or "electrically bonded" via the electrical bonding clip 204. A series of panels 82" that collectively define the panel assembly 200 may therefore be electrically connected by each associated electrical bonding clip 204, namely by installing at least one electrical bonding clip 204 on each adjacent pair of panels 82" that collectively define a corresponding standing seam 202. This electrical path may be used to ground the entire panel assembly 200 (e.g., by running a grounding wire from one or more of the panels 82" of the panel assembly 200 to ground, as each adjacent pair of standing seam panels 82" in the panel assembly 200 should be electrically interconnected by at least one electrical bonding clip 204). An electrical path in accordance with the embodiment of FIGS. 5A-5E may be from the left metal panel 82" in the views shown in FIGS. 5A and 5B, to the first clip member 212 of the clip section 248 (including via one or more grounding projections 128 of the first clip member 212 of the clip section 248 that engages the underside of this left metal panel 82"), from the first clip member 212 of the clip section 248 to the first clip member 212 of the clip section 252 via the intermediate portion 260 of the plate 256, and from the first clip member 212 of the clip section 252 to the right metal panel 82" in the view of FIGS. 5A and 5B (including via one or more grounding projections 128 of the first clip member 212 for the clip section 252 that engages this right metal panel 82").

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. An electrical bonding clip for providing an electrical connection between two metal panels that are a part of a panel assembly having a standing seam, the electrical bonding clip configured to be oriented in a vertical dimension when in a position of use, comprising:

a first clip member including a first outer surface that is continuous between a first upper surface and a second lower surface of the electrical bonding clip, the second lower surface being opposite of the first upper surface, the first clip member including a first grounding projection that extends to a first engaging edge without breaking a first plane defined by the first outer surface;

a second clip member disposed in opposing relation to the first clip member, the second clip member including a second outer surface that is continuous between the first upper surface and the second lower surface of the electrical bonding clip, the second clip member including a second grounding projection that extends to a second engaging edge without breaking a second plane defined by the second outer surface;

a closed end section operable to connect the first clip member to the second clip member, the closed end section including a third outer surface that is continuous and having a substantially constant radius between the first upper surface and the second lower surface of the electrical bonding clip, wherein the first grounding projection is pointed toward the closed end section; and an open inlet section opposite the closed end section and operable to receive the standing seam, wherein the second grounding projection is pointed toward the open inlet section, wherein a first height of the first outer surface is substantially equal to a second height of the second outer surface and is substantially equal to a third height of the third outer surface, and wherein, when the electrical bonding clip is installed on the panel assembly:

the second clip member is located within a cavity defined by a first surface of a first one of the two metal panels and a first surface of a second one of the two metal panels, and the second grounding projection engages the first surface of the second one of the two metal panels.

2. The electrical bonding clip of claim 1, wherein at least one of the first upper surface and the second lower surface are substantially planar.

3. The electrical bonding clip of claim 1, wherein the first clip member comprises a first inlet surface positioned at the open inlet section and extending between the first upper surface and the second lower surface, and wherein the second clip member comprises a second inlet surface positioned at the open inlet section and extending between the first upper surface and the second lower surface.

4. The electrical bonding clip of claim 3, wherein the first inlet surface and the second inlet surface extend in a lateral direction at the open inlet section relative to a reference plane through the closed end section and the open inlet section.

5. The electrical bonding clip of claim 4, wherein at least one of:

at least a portion of the first clip member is contoured to conform to an arc to cause the first inlet surface to extend in the lateral direction at the open inlet section relative to the reference plane; and at least a portion of the second clip member is contoured to conform to an arc to cause the second inlet surface to extend in the lateral direction at the open inlet section relative to the reference plane.

6. The electrical bonding clip of claim 1, wherein the first grounding projection extends from the first clip member in a medial direction relative to a reference plane through the closed end section and the open inlet section and into a cavity defined between the first clip member and the second clip member.

7. The electrical bonding clip of claim 6, wherein the first grounding projection is positioned in an intermediate portion of the first clip member between the closed end section and a first inlet surface of the first clip member.

8. The electrical bonding clip of claim 6, wherein the first grounding projection is positioned between the first upper surface and the second lower surface of the electrical bonding clip and within the first outer surface of the first clip member.

9. The electrical bonding clip of claim 1, wherein the second grounding projection extends from the second clip member in a medial direction relative to a reference plane through the closed end section and the open inlet section and into a cavity defined between the first clip member and the second clip member.

10. The electrical bonding clip of claim 9, wherein at least one of:

the second grounding projection is positioned in an intermediate portion of the second clip member between the closed end section and a second inlet surface of the second clip member; and the second grounding projection is positioned between the first upper surface and the second lower surface of the electrical bonding clip and within the second outer surface of the second clip member.

11. The electrical bonding clip of claim 1, wherein the first grounding projection is positioned proximate to the first upper surface of the electrical bonding clip, and wherein the second grounding projection is positioned proximate to the second lower surface of the electrical bonding clip.

12. The electrical bonding clip of claim 1, wherein, when the electrical bonding clip is installed on the panel assembly, the standing seam is positioned within the open inlet section such that the first clip member is positioned lateral from a first sidewall of the standing seam formed by the first one of the two metal panels and the second clip member is positioned lateral from a second sidewall of the standing seam formed by the second one of the two metal panels, and wherein the second sidewall of the standing seam includes the first surface of the second one of the two metal panels.

13. The electrical bonding clip of claim 12, wherein, when the electrical bonding clip is installed on the panel assembly, a first end surface of the first one of the two metal panels and a second end surface of the second one of the two metal panels is within a cavity defined between the first clip member and the second clip member and proximal to an inner surface of the closed end section.

14. The electrical bonding clip of claim 12, wherein, when the electrical bonding clip is installed on the panel assembly, the electrical bonding clip is configured such that the second clip member is positioned between the second sidewall of the standing seam formed by the second one of the two metal panels and an outer sidewall of the standing seam formed by the first one of the two metal panels, and wherein the outer sidewall of the standing seam includes the first surface of the first one of the two metal panels.

15. The electrical bonding clip of claim 1, wherein at least one of:

the electrical bonding clip is formed of a conductive metal or metal alloy, and wherein the electrical bonding clip is of an integral construction;

the first clip member and the second clip member are biased toward each other prior to installation of the electrical bonding clip on the panel assembly; and the first engaging edge and the second engaging edge are each configured to break a coating on the two metal panels of the panel assembly.

16. The electrical bonding clip of claim 1, wherein the first grounding projection of the first clip member engages a second surface of the first one of the two metal panels, and wherein the second grounding projection is configured to scratch the first surface of the second one of the two metal panels.

17. The electrical bonding clip of claim 1, wherein the first grounding projection at least partially breaks a third plane defined by a first inner surface of the first clip member.

18. The electrical bonding clip of claim 1, wherein:

the first grounding projection is a first distance from the closed end section; and the second grounding projection is a second distance from the closed end section, the second distance being less than the first distance.

19. An electrical bonding clip for providing an electrical connection between two metal panels that are a part of a panel assembly having a standing seam, the electrical bonding clip configured to be oriented in a vertical dimension when in a position of use, comprising:

a first clip member including a first single grounding projection, wherein the first single grounding projection is positioned proximate to a first upper surface of the electrical bonding clip;

a second clip member disposed in opposing relation to the first clip member and including a second single grounding projection, wherein the second single grounding projection is positioned proximate to a second lower surface of the electrical bonding clip;

a closed end section operable to connect the first clip member to the second clip member, wherein the first single grounding projection is pointed toward the closed end section; and an open inlet section opposite the closed end section and operable to receive the standing seam, wherein the second single grounding projection is pointed toward the open inlet section, wherein the first single grounding projection extends from the first clip member in a first direction toward the second clip member and to a first engaging edge without breaking a first plane defined by a first outer surface that is continuous between the first upper surface and second lower surface, wherein the second single grounding projection extends from the second clip member in a second direction toward the first clip member and to a second engaging edge without breaking a second plane defined by a second outer surface that is continuous between the first upper surface and second lower surface, and wherein, when the electrical bonding clip is installed on the panel assembly:

the second clip member is located within a cavity defined by a first surface of a first one of the two metal panels and a first surface of a second one of the two metal panels, and the second single grounding projection engages the first surface of the second one of the two metal panels.

20. An electrical bonding clip for providing an electrical connection between two metal panels that are a part of a panel assembly having a standing seam, the electrical bonding clip configured to be oriented in a vertical dimension when in a position of use, comprising:

a first clip member;

a second clip member disposed in opposing relation to the first clip member;

a closed end section operable to connect the first clip member to the second clip member, the closed end section including a first upper surface and a second lower surface connecting the first clip member and the second clip member, wherein the first upper surface and the second lower surface are each contoured to conform to a respective arc with a substantially constant radius such that the first clip member and the second clip member are biased toward each other prior to installation of the electrical bonding clip on the panel assembly;

an open inlet section opposite the closed end section and operable to receive the standing seam; and a grounding projection extending from a portion of the second clip member, toward the open inlet section, to an engaging edge without breaking an outer surface plane of the second clip member that is continuous between the first upper surface and the second lower surface thereof, wherein, when the electrical bonding clip is installed on the panel assembly:

the second clip member is located within a cavity defined by a first surface of a first one of the two metal panels and a first surface of a second one of the two metal panels, and the grounding projection scratches the first surface of the second one of the two metal panels.

* * * * *